United States Patent
Zhang

(10) Patent No.: US 12,543,074 B2
(45) Date of Patent: Feb. 3, 2026

(54) METHOD AND DEVICE IN NODES USED FOR WIRELESS COMMUNICATION

(71) Applicant: Apogee Networks, LLC, Plano, TX (US)

(72) Inventor: Xiaobo Zhang, Shanghai (CN)

(73) Assignee: Apogee Networks, LLC, Plano, TX (US)

( * ) Notice: Subject to any disclaimer, the term of this patent is extended or adjusted under 35 U.S.C. 154(b) by 469 days.

(21) Appl. No.: 18/115,000

(22) Filed: Feb. 28, 2023

(65) Prior Publication Data

US 2023/0232284 A1    Jul. 20, 2023

Related U.S. Application Data

(63) Continuation of application No. PCT/CN2021/115236, filed on Aug. 30, 2021.

(30) Foreign Application Priority Data

Sep. 4, 2020    (CN) .......................... 202010922973.6

(51) Int. Cl.
*H04W 72/0446*    (2023.01)
*H04W 28/26*    (2009.01)

(52) U.S. Cl.
CPC ....... *H04W 28/26* (2013.01); *H04W 72/0446* (2013.01)

(58) Field of Classification Search
CPC .................................................. H04W 72/0446
See application file for complete search history.

(56) References Cited

U.S. PATENT DOCUMENTS

| 2011/0310823 | A1  | 12/2011 | Nam |
| 2021/0007129 | A1* | 1/2021  | Talarico ............ H04W 72/1268 |
| 2022/0255707 | A1* | 8/2022  | Papasakellariou .... H04L 1/1858 |
| 2022/0256572 | A1* | 8/2022  | Kim ...................... H04W 72/23 |
| 2022/0346101 | A1* | 10/2022 | Behravan .............. H04L 1/1854 |

FOREIGN PATENT DOCUMENTS

| CN | 103973397 A | 8/2014 |
| CN | 111107658 A | 5/2020 |
| CN | 111586843 A | 8/2020 |
| CN | 111615193 A | 9/2020 |

OTHER PUBLICATIONS

ISR received in application No. PCT/CN2021/115236 dated Oct. 28, 2021.

* cited by examiner

*Primary Examiner* — Khaled M Kassim
*Assistant Examiner* — Shima Wasel
(74) *Attorney, Agent, or Firm* — Volpe Koenig

(57) ABSTRACT

The present application discloses a method and a device in a node for wireless communications. A first receiver receives a first signaling and a second signaling; and a first transmitter transmits a first signal in a target radio resource block, the first signal carrying a first bit block; wherein the first signaling is used to determine the first bit block, and the first signaling is used to determine a first radio resource block; the second signaling is used to determine a second radio resource block, the second radio resource block being reserved for a second bit block; the first bit block comprises at least one of first-type information bit(s) or second-type information bit(s); the second signaling comprises a first field; when the first bit block comprises the first-type information bit(s).

20 Claims, 6 Drawing Sheets

METHOD AND DEVICE IN NODES USED FOR WIRELESS COMMUNICATION

CROSS REFERENCE TO RELATED APPLICATIONS

This application is the continuation of the international patent application No. PCT/CN2021/115236, filed on Aug. 30, 2021, which claims the priority benefit of Chinese Patent Application No. 202010922973.6, filed on Sep. 4, 2020, the full disclosure of which is incorporated herein by reference.

BACKGROUND

Technical Field

The present application relates to transmission methods and devices in wireless communication systems, and in particular to a method and device for radio signal transmission in a wireless communication system supporting cellular networks.

Related Art

In the 5G system, Enhance Mobile Broadband (eMBB) and Ultra Reliable and Low Latency Communication (URLLC) are two typical service types. Targeting the request for a lower target BLER (i.e., $10^{-5}$) in URLLC services, the 3rd Generation Partner Project (3GPP) has defined a new Modulation and Coding Scheme (MCS) in New Radio (NR) Release 15. To support more demanding URLLC traffics, for instance, with higher reliability (e.g., the target BLER is $10^{-6}$), lower latency (e.g., 0.5-1 ms) and so on, a Downlink Control Information (DCI) signaling can, as defined in the 3GPP NR Release 16, indicate whether services being scheduled is of Low Priority or High Priority, where the Low Priority is for URLLC services while the High Priority is for eMBB services. When a transmission of Low Priority is overlapping with a transmission of High Priority, the High-priority transmission is performed and the Low-priority one is dropped.

A Work Item (WI) of URLLC enhancement in NR Release 17 was approved by the 3GPP RAN Plenary. The WI is proceeded with a focus of study on the Multiplexing of different intra-User-Equipment (Intra-UE) services.

SUMMARY

In some scenarios after introducing the multiplexing of various intra-UE traffics of high and low priorities, a UE can multiplex Uplink Control Information (UCI) of high priority onto a Physical Uplink Control CHannel (PUSCH) of low priority for transmission. Considering the requirement for low delay of high-priority information, a DCI corresponding to a high-priority Hybrid Automatic Repeat reQuest Acknowledgement (HARQ-ACK) is probably received only after a DCI scheduling a low-priority PUSCH by the UE: how to determine the numbers of bits in HARQ-ACKs multiplexed in the above scenarios is a key issue to be solved.

To address the above problem, the present application provides a solution. The statement above only took Uplink (UL) for example: but the present application also applies to Downlink (DL) and Sidelink (SL) transmission scenarios, where similar technical effect can be achieved. Additionally, the adoption of a unified solution for various scenarios, including but not limited to UL, DL and SL, contributes to the reduction of hardcore complexity and costs. It should be noted that if no conflict is incurred, embodiments in a User Equipment (UE) in the present application and the characteristics of the embodiments are also applicable to a base station, and vice versa. What's more, the embodiments in the present application and the characteristics in the embodiments can be arbitrarily combined if there is no conflict.

In one embodiment, interpretations of the terminology in the present application refer to definitions given in the 3GPP TS36 series.

In one embodiment, interpretations of the terminology in the present application refer to definitions given in the 3GPP TS38 series.

In one embodiment, interpretations of the terminology in the present application refer to definitions given in the 3GPP TS37 series.

In one embodiment, interpretations of the terminology in the present application refer to definitions given in Institute of Electrical and Electronics Engineers (IEEE) protocol specifications.

The present application provides a method in a first node for wireless communications, comprising:
  receiving a first signaling and a second signaling;
  transmitting a first signal in a target radio resource block, the first signal carrying a first bit block;
  herein, the first signaling is used to determine the first bit block, and the first signaling is used to determine a first radio resource block; the second signaling is used to determine a second radio resource block, the second radio resource block being reserved for a second bit block; the first radio resource block and the second radio resource block are overlapping in time domain; the target radio resource block is one of the first radio resource block or the second radio resource block; the first bit block comprises at least one of first-type information bit(s) or second-type information bit(s); the second signaling comprises a first field; when the first bit block does not comprise the first-type information bit(s), a field comprised in the second signaling is used to determine a total number of bits comprised in the first bit block; when the first bit block comprises the first-type information bit(s), a temporal order in which the first signaling and the second signaling are received is used to determine a relation between the first field in the second signaling and the total number of bits comprised in the first bit block.

In one embodiment, a problem to be solved in the present application includes: an issue of determining whether or how a Downlink Assignment Index (DAI) in a DCI scheduling the PUSCH is to be used for determining a number of bits of the HARQ-ACK being multiplexed according to an order of corresponding DCI reception in a case when a HARQ-ACK is multiplexed on a PUSCH.

In one embodiment, a problem to be solved in the present application includes: an issue of determining whether or how a DAI in a DCI scheduling the PUSCH corresponding to the second priority is to be used for determining a number of bits of the HARQ-ACK of the first priority being multiplexed according to an order of corresponding DCI reception in a case when a HARQ-ACK of a first priority is multiplexed on a PUSCH corresponding to a second priority.

In one embodiment, a problem to be solved in the present application includes: an issue of determining whether or how a DAI in a DCI scheduling the PUSCH corresponding to the second priority is to be used according to an order of DCI reception in a case when a UCI of a first priority is multiplexed on a PUSCH corresponding to a second priority.

In one embodiment, the first priority and the second priority in the present application are respectively different priorities.

In one embodiment, the first priority and the second priority in the present application respectively correspond to different priority indexes.

In one embodiment, the first priority in the present application is a priority higher than the second priority.

In one embodiment, an advantage of the above method is that: the transmission performance of high-priority information is improved.

In one embodiment, an advantage of the above method is that: the requirement for low latency in high-priority information transmission can be better satisfied.

In one embodiment, an advantage of the above method is that: the rate of low-priority data being dropped due to a collision with high-priority information transmission can be reduced.

In one embodiment, an advantage of the above method is that: the spectral efficiency can be enhanced.

In one embodiment, an advantage of the above method is that: the flexibility of system scheduling can be enhanced.

In one embodiment, an advantage of the above method is that: for scenarios with intra-UE traffics of different priorities being multiplexed, the usage method of a DAI field (UL DAI) in DCI scheduling a PUSCH can be optimized.

In one embodiment, the word collision in the present application includes: being overlapping in time domain.

According to one aspect of the present application, the above method is characterized in comprising:
receiving a first signaling group;
herein, each signaling in the first signaling group is used to determine the first bit block; the first signaling is a last one of signalings in the first signaling group.

According to one aspect of the present application, the above method is characterized in that, the target radio resource block is the second radio resource block; the first signal carries the second bit block.

According to one aspect of the present application, the above method is characterized in that,
when the first bit block comprises the first-type information bit; the temporal order in which the first signaling and the second signaling are received is used to determine whether the first field in the second signaling is used to determine the total number of bits comprised in the first bit block.

In one embodiment, the essence of the above method lies in that: a HARQ-ACK corresponding to first DCI is multiplexed onto a PUSCH scheduled by second DCI; the first node determines according to a temporal order in which the first DCI and the second DCI are received whether a DAI field comprised in the second DCI is used to determine a size of a HARQ-ACK codebook comprising the HARQ-ACK corresponding to the first DCI that is multiplexed onto the PUSCH scheduled by the second DCI.

According to one aspect of the present application, the above method is characterized in that, when the first bit block comprises the first-type information bit and the first signaling is not received after the second signaling, the first field in the second signaling is used to determine the total number of bits comprised in the first bit block; when the first bit block comprises the first-type information bit and the first signaling is received after the second signaling, the first field in the second signaling is not used to determine the total number of bits comprised in the first bit block.

According to one aspect of the present application, the above method is characterized in that, when the first bit block comprises the first-type information bit; the temporal order in which the first signaling and the second signaling are received is used to determine whether the first field in the second signaling is used to determine the total number of bits comprised in the first bit block or is at most used to determine a total number of bits comprised in a bit sub-block comprised in the first bit block.

In one embodiment, the essence of the above method lies in that: a HARQ-ACK corresponding to first DCI is multiplexed onto a PUSCH scheduled by second DCI; the first node determines according to a temporal order in which the first DCI and the second DCI are received how a DAI field comprised in the second DCI is used to determine a size of a HARQ-ACK codebook comprising the HARQ-ACK corresponding to the first DCI that is multiplexed onto the PUSCH scheduled by the second DCI.

According to one aspect of the present application, the above method is characterized in that,
the first signaling and the second signaling are respectively used to determine an index in a first index set; the first index set comprises a first index and a second index; the first-type information bit(s) corresponds (correspond) to the first index, while the second-type information bit(s) corresponds (correspond) to the second index; the second signaling is used to determine the second index.

The present application provides a method in a second node for wireless communications, comprising:
transmitting a first signaling and a second signaling;
receiving a first signal in a target radio resource block, the first signal carrying a first bit block;
herein, the first signaling is used to determine the first bit block, and the first signaling is used to determine a first radio resource block; the second signaling is used to determine a second radio resource block, the second radio resource block being reserved for a second bit block; the first radio resource block and the second radio resource block are overlapping in time domain; the target radio resource block is one of the first radio resource block or the second radio resource block; the first bit block comprises at least one of first-type information bit(s) or second-type information bit(s); the second signaling comprises a first field; when the first bit block does not comprise the first-type information bit(s), a field comprised in the second signaling is used to determine a total number of bits comprised in the first bit block; when the first bit block comprises the first-type information bit(s), a temporal order in which the first signaling and the second signaling are received is used to determine a relation between the first field in the second signaling and the total number of bits comprised in the first bit block.

According to one aspect of the present application, the above method is characterized in comprising:
transmitting a first signaling group;
herein, each signaling in the first signaling group is used to determine the first bit block; the first signaling is a last one of signalings in the first signaling group.

According to one aspect of the present application, the above method is characterized in that,
the target radio resource block is the second radio resource block; the first signal carries the second bit block.

According to one aspect of the present application, the above method is characterized in that,
when the first bit block comprises the first-type information bit; the temporal order in which the first signaling and the second signaling are received is used to determine whether the first field in the second signaling is used to determine the total number of bits comprised in the first bit block.

According to one aspect of the present application, the above method is characterized in that, when the first bit block comprises the first-type information bit and the first signaling is not received after the second signaling, the first field in the second signaling is used to determine the total number of bits comprised in the first bit block; when the first bit block comprises the first-type information bit and the first signaling is received after the second signaling, the first field in the second signaling is not used to determine the total number of bits comprised in the first bit block.

According to one aspect of the present application, the above method is characterized in that, when the first bit block comprises the first-type information bit; the temporal order in which the first signaling and the second signaling are received is used to determine whether the first field in the second signaling is used to determine the total number of bits comprised in the first bit block or is at most used to determine a total number of bits comprised in a bit sub-block comprised in the first bit block.

According to one aspect of the present application, the above method is characterized in that, the first signaling and the second signaling are respectively used to determine an index in a first index set; the first index set comprises a first index and a second index; the first-type information bit(s) corresponds (correspond) to the first index, while the second-type information bit(s) corresponds (correspond) to the second index; the second signaling is used to determine the second index.

The present application provides a first node for wireless communications, comprising:

a first receiver, receiving a first signaling and a second signaling; and a first transmitter, transmitting a first signal in a target radio resource block, the first signal carrying a first bit block;

herein, the first signaling is used to determine the first bit block, and the first signaling is used to determine a first radio resource block; the second signaling is used to determine a second radio resource block, the second radio resource block being reserved for a second bit block; the first radio resource block and the second radio resource block are overlapping in time domain; the target radio resource block is one of the first radio resource block or the second radio resource block; the first bit block comprises at least one of first-type information bit(s) or second-type information bit(s); the second signaling comprises a first field; when the first bit block does not comprise the first-type information bit(s), a field comprised in the second signaling is used to determine a total number of bits comprised in the first bit block; when the first bit block comprises the first-type information bit(s), a temporal order in which the first signaling and the second signaling are received is used to determine a relation between the first field in the second signaling and the total number of bits comprised in the first bit block.

The present application provides a second node for wireless communications, comprising:

a second transmitter, transmitting a first signaling and a second signaling; and a second receiver, receiving a first signal in a target radio resource block, the first signal carrying a first bit block;

herein, the first signaling is used to determine the first bit block, and the first signaling is used to determine a first radio resource block; the second signaling is used to determine a second radio resource block, the second radio resource block being reserved for a second bit block; the first radio resource block and the second radio resource block are overlapping in time domain; the target radio resource block is one of the first radio resource block or the second radio resource block; the first bit block comprises at least one of first-type information bit(s) or second-type information bit(s); the second signaling comprises a first field; when the first bit block does not comprise the first-type information bit(s), a field comprised in the second signaling is used to determine a total number of bits comprised in the first bit block; when the first bit block comprises the first-type information bit(s), a temporal order in which the first signaling and the second signaling are received is used to determine a relation between the first field in the second signaling and the total number of bits comprised in the first bit block.

In one embodiment, the method in the present application has the following advantages:

ensuring the transmission performance of high-priority information ensuring the flexibility of system scheduling on the condition of balancing the requirement for low latency in high-priority information transmission and the transmission performance of low-priority data;

optimizing the way of using a DAI field in DCI that schedules a PUSCH.

BRIEF DESCRIPTION OF THE DRAWINGS

Other features, objects and advantages of the present application will become more apparent from the detailed description of non-restrictive embodiments taken in conjunction with the following drawings.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
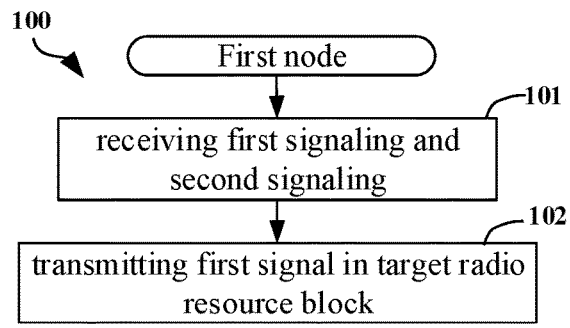
FIG. 1 illustrates a flowchart of processing of a first node according to one embodiment of the present application.

Embodiment 1 illustrates a flowchart of processing of a first node according to one embodiment of the present application, as shown in FIG. 1.

In Embodiment 1, the first node in the present application receives a first signaling and a second signaling in step 101; and transmits a first signal in a target radio resource block in step 102.

In Embodiment 1, the first signal carries a first bit block; the first signaling is used to determine the first bit block, and the first signaling is used to determine a first radio resource block; the second signaling is used to determine a second radio resource block, the second radio resource block being reserved for a second bit block; the first radio resource block and the second radio resource block are overlapping in time domain; the target radio resource block is one of the first radio resource block or the second radio resource block; the first bit block comprises at least one of first-type information bit(s) or second-type information bit(s); the second signaling comprises a first field; when the first bit block does not comprise the first-type information bit(s), a field comprised in the second signaling is used to determine a total number of bits comprised in the first bit block; when the first bit block comprises the first-type information bit(s), a temporal order in which the first signaling and the second signaling are received is used to determine a relation between the first field in the second signaling and the total number of bits comprised in the first bit block.

In one embodiment, the first signal comprises a radio signal.

In one embodiment, the first signal comprises a radio frequency signal.

In one embodiment, the first signal comprises a baseband signal.

In one embodiment, the first node firstly receives the second signaling and then receives the first signaling.

In one embodiment, the first node firstly receives the first signaling and then receives the second signaling.

In one embodiment, the first node receives the first signaling and the second signaling simultaneously.

In one embodiment, the first signaling is dynamically configured.

In one embodiment, the first signaling comprises a layer 1 (L1) signaling.

In one embodiment, the first signaling comprises a layer 1 (L1) control signaling.

In one embodiment, the first signaling comprises a Physical Layer signaling.

In one embodiment, the first signaling comprises one or more fields in a physical layer signaling.

In one embodiment, the first signaling comprises a Higher Layer signaling.

In one embodiment, the first signaling comprises one or more fields in a Higher Layer signaling.

In one embodiment, the first signaling comprises a Radio Resource Control (RRC) signaling.

In one embodiment, the first signaling comprises a Medium Access Control layer Control Element (MAC CE) signaling.

In one embodiment, the first signaling comprises one or more fields in an RRC signaling.

In one embodiment, the first signaling comprises one or more fields in a MAC CE signaling.

In one embodiment, the first signaling comprises Downlink Control Information (DCI).

In one embodiment, the first signaling comprises one or more fields in a DCI.

In one embodiment, the first signaling comprises Sidelink Control Information (SCI).

In one embodiment, the first signaling comprises one or more fields in an SCI.

In one embodiment, the first signaling comprises one or more fields in an Information Element (IE).

In one embodiment, the first signaling is a DownLink Grant Signaling.

In one embodiment, the first signaling is transmitted in a downlink physical layer control channel (i.e., a downlink channel only capable of bearing physical layer signaling).

In one embodiment, the downlink physical layer control channel in the present application is a Physical Downlink Control CHannel (PDCCH).

In one embodiment, the downlink physical layer control channel in the present application is a short PDCCH (sPDCCH).

In one embodiment, the downlink physical layer control channel in the present application is a Narrow Band PDCCH (NB-PDCCH).

In one embodiment, the first signaling is DCI format 1_0, for the specific definition of the DCI format 1_0, refer to 3GPP TS38.212. Chapter 7.3.1.2.

In one embodiment, the first signaling is DCI format 1_1, for the specific definition of the DCI format 1_1, refer to 3GPP TS38.212. Chapter 7.3.1.2.

In one embodiment, the first signaling is DCI format 1_2, for the specific definition of the DCI format 1_2, refer to 3GPP TS38.212. Chapter 7.3.1.2.

In one embodiment, the first signaling is a signaling used for scheduling a downlink physical layer data channel.

In one embodiment, the downlink physical layer data channel in the present application is a Physical Downlink Shared Channel (PDSCH).

In one embodiment, the downlink physical layer data channel in the present application is a short PDSCH (SPDSCH).

In one embodiment, the downlink physical layer data channel in the present application is a Narrow Band PDSCH (NB-PDSCH).

In one embodiment, the second signaling is dynamically configured.

In one embodiment, the second signaling comprises a layer 1 (L1) signaling.

In one embodiment, the second signaling comprises a layer 1 (L1) control signaling.

In one embodiment, the second signaling comprises a physical-layer signaling.

In one embodiment, the second signaling comprises one or more fields in a physical layer signaling.

In one embodiment, the second signaling comprises a higher-layer signaling.

In one embodiment, the second signaling comprises one or more fields in a Higher Layer signaling.

In one embodiment, the second signaling comprises an RRC signaling.

In one embodiment, the second signaling comprises a MAC CE signaling.

In one embodiment, the second signaling comprises one or more fields in an RRC signaling.

In one embodiment, the second signaling comprises one or more fields in a MAC CE signaling.

In one embodiment, the second signaling comprises DCI.

In one embodiment, the second signaling comprises one or more fields in a DCI.

In one embodiment, the second signaling comprises SCI.

In one embodiment, the second signaling comprises one or more fields in an SCI.

In one embodiment, the second signaling comprises one or more fields in an IE.

In one embodiment, the second signaling is an UpLink Grant Signaling.

In one embodiment, the second signaling is transmitted in a downlink physical layer control channel (i.e., a downlink channel only capable of bearing physical layer signaling).

In one embodiment, the second signaling is DCI format 0_0, for the specific definition of the DCI format 0_0, refer to 3GPP TS38.212, Chapter 7.3.1.1.

In one embodiment, the second signaling is DCI format 0_1, for the specific definition of the DCI format 0_1, refer to 3GPP TS38.212. Chapter 7.3.1.1.

In one embodiment, the second signaling is DCI format 0_2, for the specific definition of the DCI format 0_2, refer to 3GPP TS38.212. Chapter 7.3.1.1.

In one embodiment, the second signaling is a signaling used for scheduling an uplink physical layer data channel.

In one embodiment, the phrase that the first signal carries a first bit block includes that: the first signal comprises an output by all or part of bits in the first bit block sequentially through some or all of CRC Insertion, Segmentation, Code Block (CB)-level CRC Insertion, Channel Coding, Rate Matching, Concatenation, Scrambling, Modulation, Layer Mapping. Precoding. Mapping to Resource Element. Multicarrier Symbol Generation, and Modulation and Upconversion.

In one embodiment, the first radio resource block comprises a positive integer number of Resource Element(s) (RE(s)) in time-frequency domain.

In one embodiment, a said RE occupies a multicarrier symbol in time domain, and a subcarrier in frequency domain.

In one embodiment, the multicarrier symbol in the present application is an Orthogonal Frequency Division Multiplexing (OFDM) Symbol.

In one embodiment, the multicarrier symbol in the present application is a Single Carrier-Frequency Division Multiple Access (SC-FDMA) symbol.

In one embodiment, the multicarrier symbol in the present application is a Discrete Fourier Transform Spread OFDM (DFT-S-OFDM) symbol.

In one embodiment, the first radio resource block comprises a positive integer number of first-type multicarrier symbol(s) in time domain, while the second radio resource block comprises a positive integer number of the first-type multicarrier symbol(s) in time domain.

In one subembodiment of the above embodiment, the first-type multicarrier symbol is a multicarrier symbol corresponding to one of SCS configurations 15 kHz. 30 kHz, 60 kHz. 120 kHz or 240 kHz.

In one embodiment, the first radio resource block comprises a positive integer number of subcarrier(s) in frequency domain.

In one embodiment, the first radio resource block comprises a positive integer number of Physical Resource Block(s) (PRB(s)) in frequency domain.

In one embodiment, the first radio resource block comprises a positive integer number of Resource Block(s) (RB(s)) in frequency domain.

In one embodiment, the first radio resource block comprises a positive integer number of multicarrier symbol(s) in time domain.

In one embodiment, the first radio resource block comprises a positive integer number of slot(s) in time domain.

In one embodiment, the first radio resource block comprises a positive integer number of sub-slot(s) in time domain.

In one embodiment, the first radio resource block comprises a positive integer number of millisecond(s) (ms) in time domain.

In one embodiment, the first radio resource block comprises a positive integer number of consecutive multicarrier symbols in time domain.

In one embodiment, the first radio resource block comprises a positive integer number of non-consecutive slots in time domain.

In one embodiment, the first radio resource block comprises a positive integer number of consecutive slots in time domain.

In one embodiment, the first radio resource block comprises a positive integer number of sub-frame(s) in time domain.

In one embodiment, the first radio resource block is configured by a physical layer signaling.

In one embodiment, the first radio resource block is configured by a higher layer signaling.

In one embodiment, the first radio resource block is configured by a Radio Resource Control (RRC) signaling.

In one embodiment, the first radio resource block is configured by a Medium Access Control layer Control Element (MAC CE) signaling.

In one embodiment, the first radio resource block is reserved for a physical layer channel.

In one embodiment, the first radio resource block comprises radio resources reserved for a physical layer channel.

In one embodiment, the first radio resource block comprises radio resources occupied by a physical layer channel.

In one embodiment, the first radio resource block comprises time-frequency resources occupied by a physical layer channel in time-frequency domain.

In one embodiment, the first radio resource block comprises time-frequency resources reserved for a physical layer channel in time-frequency domain.

In one embodiment, the physical layer channel in the present application includes a Physical Uplink Control CHannel (PUCCH) or a Physical Uplink Shared CHannel (PUSCH).

In one embodiment, the physical layer channel in the present application includes an uplink physical layer channel.

In one embodiment, the first radio resource block comprises a PUCCH resource.

In one embodiment, the first radio resource block comprises a PUCCH resource in a PUCCH resource set.

In one embodiment, the first radio resource block is reserved for the first bit block.

In one embodiment, a value of a field comprised in the first signaling is an index corresponding to the first radio resource block in a radio resource block set.

In one embodiment, the first signaling indicates the first radio resource block in a radio resource block set.

In one subembodiment of the above embodiment, the radio resource block set comprises a PUCCH resource set.

In one embodiment, the first signaling indicates the first radio resource block.

In one embodiment, the first signaling explicitly indicates the first radio resource block.

In one embodiment, the first signaling implicitly indicates the first radio resource block.

In one embodiment, the phrase of implicitly indicating in the present application comprises: indicating implicitly via a signaling format.

In one embodiment, the phrase of implicitly indicating in the present application comprises: indicating implicitly via a Radio Network Temporary Identity (RNTI).

In one embodiment, the second radio resource block comprises a positive integer number of RE(s) in time-frequency domain.

In one embodiment, the second radio resource block comprises a positive integer number of subcarrier(s) in frequency domain.

In one embodiment, the second radio resource block comprises a positive integer number of PRB(s) in frequency domain.

In one embodiment, the second radio resource block comprises a positive integer number of RB(s) in frequency domain.

In one embodiment, the second radio resource block comprises a positive integer number of multicarrier symbol(s) in time domain.

In one embodiment, the second radio resource block comprises a positive integer number of slot(s) in time domain.

In one embodiment, the second radio resource block comprises a positive integer number of sub-slot(s) in time domain.

In one embodiment, the second radio resource block comprises a positive integer number of millisecond(s) in time domain.

In one embodiment, the second radio resource block comprises a positive integer number of consecutive multicarrier symbols in time domain.

In one embodiment, the second radio resource block comprises a positive integer number of non-consecutive slots in time domain.

In one embodiment, the second radio resource block comprises a positive integer number of consecutive slots in time domain.

In one embodiment, the second radio resource block comprises a positive integer number of sub-frame(s) in time domain.

In one embodiment, the second radio resource block is configured by a physical layer signaling.

In one embodiment, the second radio resource block is configured by a higher layer signaling.

In one embodiment, the second radio resource block is configured by an RRC signaling.

In one embodiment, the second radio resource block is configured by a MAC CE signaling.

In one embodiment, the second radio resource block is reserved for a physical layer channel.

In one embodiment, the second radio resource block comprises radio resources reserved for a physical layer channel.

In one embodiment, the second radio resource block comprises radio resources occupied by a physical layer channel.

In one embodiment, the second radio resource block comprises time-frequency resources occupied by a physical layer channel in time-frequency domain.

In one embodiment, the second radio resource block comprises time-frequency resources reserved for a physical layer channel in time-frequency domain.

In one embodiment, the second radio resource block comprises radio resources occupied by a PUSCH.

In one embodiment, the second radio resource block is reserved for a PUSCH transmission.

In one embodiment, the second radio resource block is reserved for a PUSCH transmission used for bearing the second bit block.

In one embodiment, the second signaling indicates the second radio resource block.

In one embodiment, the second signaling explicitly indicates the second radio resource block.

In one embodiment, the second signaling implicitly indicates the second radio resource block.

In one embodiment, the second signaling indicates time-domain resources occupied by the second radio resource block.

In one embodiment, the second signaling indicates frequency-domain resources occupied by the second radio resource block.

In one embodiment, the first radio resource block comprises a positive integer number of first-type multicarrier symbol(s) in time domain, while the second radio resource block comprises a positive integer number of second-type multicarrier symbol(s) in time domain.

In one subembodiment of the above embodiment, the first-type multicarrier symbol and the second-type multicarrier symbol are respectively multicarrier symbols corresponding to different SubCarrier Spacings (SCS).

In one subembodiment of the above embodiment, the first-type multicarrier symbol and the second-type multicarrier symbol are respectively multicarrier symbols occupying different time lengths.

In one embodiment, the second signaling comprises second scheduling information: the second scheduling information comprises at least one of time-domain resources occupied, frequency-domain resources occupied, a Modulation and Coding Scheme (MCS), configuration information of DeModulation Reference Signals (DMRS), a Hybrid Automatic Repeat reQuest (HARQ) process number, a Redundancy Version (RV), a New Data Indicator (NDI), periodicity, an transmission antenna port, or a corresponding Transmission Configuration Indicator (TCI) state.

In one embodiment, the first bit block comprises information indicating whether the first signaling is correctly received, or, the first bit block comprises information indicating whether a bit block scheduled by the first signaling is correctly received.

In one embodiment, the first bit block comprises information indicating whether the first signaling is correctly received, or, the first bit block comprises information indicating whether a bit block transmitted on a channel scheduled by the first signaling is correctly received.

In one embodiment, the first signaling comprises first scheduling information: the first scheduling information comprises at least one of time-domain resources occupied, frequency-domain resources occupied, a Modulation and Coding Scheme (MCS), configuration information of DeModulation Reference Signals (DMRS), a Hybrid Automatic Repeat reQuest (HARQ) process number, a Redundancy Version (RV), a New Data Indicator (NDI), periodicity, an transmission antenna port, or a corresponding Transmission Configuration Indicator (TCI) state.

In one embodiment, the first signaling is used for indicating a Semi-Persistent Scheduling (SPS) Release, where the first bit block comprises a HARQ-ACK that indicates whether the first signaling is correctly received; or, the first bit block comprises a HARQ-ACK that indicates whether a bit block being transmitted on a PDSCH scheduled by the first signaling is correctly received.

In one embodiment, the phrase in the present application of being overlapping in time domain includes: being overlapping in time domain, and being overlapping in frequency domain.

In one embodiment, the phrase in the present application of being overlapping in time domain includes: being overlapping in time domain, and being overlapping or mutually orthogonal in frequency domain.

In one embodiment, time-domain resources occupied by the first radio resource block and time-domain resources occupied by the second radio resource block comprise a same multicarrier symbol.

In one embodiment, the first bit block comprises a HARQ-ACK.

In one embodiment, the first bit block comprises a positive integer number of bit(s).

In one embodiment, the first bit block comprises a positive integer number of ACK(s) or NACK(s).

In one embodiment, the first bit block comprises a HARQ-ACK codebook.

In one embodiment, the first bit block comprises only one of the first-type information bit or the second-type information bit.

In one embodiment, the first bit block comprises one or two of the first-type information bit or the second-type information bit.

In one embodiment, the first-type information bit and the second-type information bit are respectively different types of information bits.

In one embodiment, the first-type information bit comprises a first-type HARQ-ACK, while the second-type information bit comprises a second-type HARQ-ACK.

In one embodiment, the first-type HARQ-ACK and the second-type HARQ-ACK both comprise HARQ-ACK information bit(s).

In one embodiment, the first-type HARQ-ACK and the second-type HARQ-ACK both comprise type-2 HARQ-ACK codebook(s) (CB(s)).

In one embodiment, the first-type HARQ-ACK comprises a HARQ-ACK corresponding to a QoS among multiple types of Quality of Service (QOS).

In one embodiment, the first-type HARQ-ACK comprises a HARQ-ACK corresponding to URLLC service type.

In one embodiment, the first-type HARQ-ACK comprises a HARQ-ACK corresponding to eMBB service type.

In one embodiment, the first-type HARQ-ACK comprises a high-priority HARQ-ACK.

In one embodiment, the first-type HARQ-ACK comprises a low-priority HARQ-ACK.

In one embodiment, the first-type HARQ-ACK comprises a HARQ-ACK corresponding to priority index 1.

In one embodiment, the first-type HARQ-ACK comprises a HARQ-ACK corresponding to priority index 0.

In one embodiment, the first-type HARQ-ACK comprises a sidelink HARQ-ACK (SL HARQ-ACK).

In one embodiment, the second-type HARQ-ACK comprises a HARQ-ACK corresponding to a QoS among multiple types of Quality of Service (QOS).

In one embodiment, the second-type HARQ-ACK comprises a HARQ-ACK corresponding to URLLC service type.

In one embodiment, the second-type HARQ-ACK comprises a HARQ-ACK corresponding to eMBB service type.

In one embodiment, the second-type HARQ-ACK comprises a high-priority HARQ-ACK.

In one embodiment, the second-type HARQ-ACK comprises a low-priority HARQ-ACK.

In one embodiment, the second-type HARQ-ACK comprises a HARQ-ACK corresponding to Priority Index 1.

In one embodiment, the second-type HARQ-ACK comprises a HARQ-ACK corresponding to Priority Index 0.

In one embodiment, the first bit block comprises UCI.

In one embodiment, the second-type HARQ-ACK comprises a sidelink HARQ-ACK.

In one embodiment, the second-type HARQ-ACK and the first-type HARQ-ACK are respectively HARQ-ACKs for different links.

In one embodiment, the different links include an uplink and a sidelink.

In one embodiment, the second-type HARQ-ACK and the first-type HARQ-ACK are respectively HARQ-ACKs used for different service types.

In one embodiment, the second-type HARQ-ACK and the first-type HARQ-ACK are respectively HARQ-ACKs of different types.

In one embodiment, the second-type HARQ-ACK and the first-type HARQ-ACK are respectively HARQ-ACKs of different priorities.

In one embodiment, the second-type HARQ-ACK and the first-type HARQ-ACK are respectively HARQ-ACKs corresponding to different priority indexes.

In one embodiment, the second-type HARQ-ACK comprises a HARQ-ACK corresponding to priority index 1, while the second-type HARQ-ACK comprises a HARQ-ACK corresponding to priority index 0.

In one embodiment, the second-type HARQ-ACK comprises a HARQ-ACK corresponding to priority index 0, while the second-type HARQ-ACK comprises a HARQ-ACK corresponding to priority index 1.

In one embodiment, the first-type information bit comprises a HARQ-ACK, while the second-type information bit comprises a Channel State Information (CSI) report or reporting.

In one embodiment, the first-type information bit comprises a HARQ-ACK, while the second-type information bit comprises a periodic CSI report/reporting or a Semi-Persistent (SP) CSI report/reporting.

In one embodiment, the first-type information bit comprises a HARQ-ACK, while the second-type information bit comprises at least a former of a Part 1 CSI or a Part 2 CSI.

In one embodiment, the first-type information bit comprises a HARQ-ACK, while the second-type information bit comprises at least a former of a Part 1 CSI or a Part 2 CSI.

In one embodiment, the sentence that a field comprised in the second signaling is used to determine a total number of bits comprised in the first bit block comprises: the field comprised in the second signaling being used to determine whether the first bit block comprises a Part 2 CSI.

In one subembodiment, the field comprised in the second signaling comprises a beta_offset indicator field.

In one subembodiment, a value obtained with a value indicated by the field comprised in the second signaling as an input is used for performing calculation or judgment to determine whether the first bit block comprises a Part 2 CSI.

In one subembodiment, the first node performs judgment to determine whether the first bit block comprises a Part 2 CSI according to the principle of judgment described in 3GPP TS38.214, Section 5.2.3.

In one embodiment, the first bit block comprises UCI.

In one embodiment, the first bit block comprises a HARQ-ACK and CSI reporting information.

In one embodiment, the first bit block comprises a HARQ-ACK and a Scheduling Request (SR).

In one embodiment, the first bit block comprises a HARQ-ACK, a CSI and an SR.

In one embodiment, the first bit block comprises at least one of a HARQ-ACK, a CSI or an SR.

In one embodiment, the first field comprises a Downlink Assignment Index (DAI) field.

In one embodiment, the first field indicates a total DAI.

In one embodiment, names of the first field include downlink assignment index.

In one embodiment, the first field comprises a positive integer number of bit(s) in a DAI field.

In one embodiment, the first field comprises a DAI field related to the first-type information bit.

In one embodiment, the first field comprises a 1st downlink assignment index field, where for the specific definition of the 1st downlink assignment index field, refer to 3GPP TS38.212, Section 7.3.1.1.

In one embodiment, the first field comprises a 2nd downlink assignment index field, where for the specific definition of the 2nd downlink assignment index field, refer to 3GPP TS38.212, Section 7.3.1.1.

In one embodiment, the first field comprises 1 bit.

In one embodiment, the first field comprises 2 bits.

In one embodiment, the first field comprises 4 bits.

In one embodiment, the first field comprises 8 bits.

In one embodiment, the first field comprises 16 bits.

In one embodiment, the first field comprises K bit(s), K being no greater than 128.

In one embodiment, the first bit block comprises a Transport Block (TB)-based HARQ-ACK codebook.

In one embodiment, the first bit block does not comprise a CBG-based HARQ-ACK codebook.

In one embodiment, the first bit block comprises a Code Block Group-based (CBG-based) HARQ-ACK codebook, and the first bit block does not comprise a TB-based HARQ-ACK codebook.

In one embodiment, the field comprised in the second signaling is the first field in the second signaling.

In one embodiment, the field comprised in the second signaling comprises the first field in the second signaling.

In one embodiment, the field comprised in the second signaling is a field other than the first field in the second signaling.

In one embodiment, the field comprised in the second signaling comprises a DAI field.

In one embodiment, the field comprised in the second signaling comprises a DAI field in the second signaling.

In one embodiment, the field comprised in the second signaling indicates a total DAI.

In one embodiment, the field comprised in the second signaling comprises a positive integer number of bit(s) in a DAI field.

In one embodiment, the field comprised in the second signaling comprises a positive integer number of bit(s) in a DAI field in the second signaling.

In one embodiment, names of the field comprised in the second signaling include downlink assignment index.

In one embodiment, the field comprised in the second signaling comprises a DAI field relating to the second-type information bit in the second signaling.

In one embodiment, the field comprised in the second signaling comprises a beta_offset indicator field in the second signaling.

In one embodiment, names of the field comprised in the second signaling include at least one of beta or offset.

In one embodiment, the field comprised in the second signaling comprises 1 bit.

In one embodiment, the field comprised in the second signaling comprises 2 bits.

In one embodiment, the field comprised in the second signaling comprises 4 bits.

In one embodiment, the field comprised in the second signaling comprises 8 bits.

In one embodiment, the field comprised in the second signaling comprises 16 bits.

In one embodiment, the field comprised in the second signaling comprises K bit(s), K being no greater than 128.

In one embodiment, the sentence that a field comprised in the second signaling is used to determine a total number of bits comprised in the first bit block comprises: the field comprised in the second signaling is used for performing calculation to determine a total number of bits comprised in the first bit block.

In one embodiment, the sentence that a field comprised in the second signaling is used to determine a total number of bits comprised in the first bit block comprises: a value indicated by the field comprised in the second signaling is an input to a procedure in which the first node performs calculation to determine a total number of bits comprised in the first bit block.

In one embodiment, the sentence that a field comprised in the second signaling is used to determine a total number of bits comprised in the first bit block comprises: In a procedure that the first node generates a HARQ-ACK codebook comprised in the first bit block based on a piece of pseudo-code, a second parameter is set as equal to a value indicated by the field comprised in the second signaling for determining a total number of bits comprised in the first bit block.

In one subembodiment, the piece of pseudo-code refers to the pseudo-code used for HARQ-ACK codebook generation in 3GPP TS38.213, Section 9.1.3.1.

In one subembodiment, the piece of pseudo-code refers to the pseudo-code used for HARQ-ACK codebook generation of the second-type HARQ-ACK in 3GPP TS38.213, Section 9.1.3.1.

In one subembodiment, the second parameter is an intermediate variable in the procedure of generating a HARQ-ACK codebook comprised in the first bit block.

In one subembodiment, the second parameter is a Vtemp2 in 3GPP TS38.213, Section 9.1.3.1.

In one subembodiment, the value indicated by the field comprised in the second signaling is equal to a value indicated by a positive integer number of bit(s) in a DAI field.

In one subembodiment, the value indicated by the field comprised in the second signaling is equal to $V_{DAI}^{UL}$ in 3GPP TS38.213, Section 9.1.3.2.

In one embodiment, the second bit block does not comprise a HARQ-ACK.

In one embodiment, the second bit block comprises a positive integer number of bit(s).

In one embodiment, the second bit block comprises a TB.

In one embodiment, the second bit block comprises a Code Block (CB).

In one embodiment, the second bit block comprises a CBG.

In one embodiment, a priority index corresponding to the second bit block and a priority index corresponding to the second-type information bit are the same.

In one embodiment, a priority index corresponding to the first-type information bit and a priority index corresponding to the first-type HARQ-ACK are the same.

In one embodiment, a priority index corresponding to the second-type information bit and a priority index corresponding to the second-type HARQ-ACK are the same.

In one embodiment, the phrase of being used for in the present application includes: being used by the first node for.

In one embodiment, the phrase of being used for in the present application includes: being used by a transmitting end for the first signal for.

In one embodiment, the phrase of being used for in the present application includes: being used by a receiving end for the first signal for.

In one embodiment, the phrase of being received in the present application includes: being received by the first node.

In one embodiment, the phrase of being received in the present application includes: being received by a transmitting end for the first signal.

In one embodiment, the phrase of being received in the present application includes: being detected.

In one embodiment, the phrase of being detected in the present application includes: being detected by the first node.

In one embodiment, the phrase of being detected in the present application includes: being detected by a transmitting end for the first signal.

In one embodiment, when the target radio resource block is the second radio resource block, the first signal carries the second bit block.

In one embodiment, the sentence that a temporal order in which the first signaling and the second signaling are received is used to determine a relation between the first field in the second signaling and the total number of bits comprised in the first bit block comprises: the temporal order in which the first signaling and the second signaling are received is used to determine whether the first field in the second signaling is used to determine the total number of bits comprised in the first bit block.

In one embodiment, the sentence that a temporal order in which the first signaling and the second signaling are received is used to determine a relation between the first field in the second signaling and the total number of bits comprised in the first bit block comprises: the temporal order in which the first signaling and the second signaling are received is used to determine whether the first field in the second signaling is used to determine the total number of bits comprised in the first bit block or is used to determine a total number of bits comprised in a bit sub-block comprised in the first bit block.

In one embodiment, when the first bit block does not comprise the first-type information bit; the first signaling is not received after the second signaling.

In one embodiment, when the first bit block does not comprise the first-type information bit; the first signaling is not received after the second signaling, the first field in the second signaling being used to determine a total number of the second-type information bit(s) comprised in the first bit block.

In one embodiment, when the first bit block comprises the first-type information bit, the first bit block does not comprise the second-type information bit.

In one embodiment, when the first bit block comprises the first-type information bit, the first bit block comprises or does not comprise the second-type information bit.

In one embodiment, when the first bit block does not comprise the first-type information bit, the first bit block comprises the second-type information bit.

In one embodiment, each HARQ-ACK being transmitted in the target radio resource block is: a HARQ-ACK which indicates whether the first signaling is correctly received, or which indicates whether a bit block transmitted on a channel scheduled by the first signaling is correctly received.

In one embodiment, any HARQ-ACK that indicates whether any signaling other than the first signaling is correctly received is not transmitted in the target radio resource block, and any HARQ-ACK that indicates whether a bit block transmitted on a channel scheduled by any signaling other than the first signaling is correctly received is not transmitted in the target radio resource block.

In one embodiment, partial HARQ-ACKs being transmitted in the target radio resource block are: HARQ-ACKs which indicate whether a signaling other than the first signaling is correctly received, or which indicate whether a bit block transmitted on a channel scheduled by a signaling other than the first signaling is correctly received.

In one embodiment, a relation between the first field in the second signaling in the present application and a total number of bits comprised in the first bit block comprises: the total number of bits comprised in the first bit block is unrelated to the first field in the second signaling, or, the total number of bits comprised in the first bit block is related to the first field in the second signaling.

In one embodiment, a temporal order in which the first signaling and the second signaling are received is the same as that in which the first signaling and the second signaling are transmitted.

In one embodiment, the target radio resource block comprises sufficient radio resources for supporting the first bit block being transmitted in the target radio resource block.

In one embodiment, when the first field in the second signaling is used to determine a total number of bits comprised in the first bit block, any field other than the first field comprised in the second signaling is not used to determine the total number of bits comprised in the first bit block.

In one embodiment, any field other than the first field comprised in the second signaling is not used to determine a total number of the first-type information bit(s) comprised in the first bit block.

In one embodiment, a HARQ-ACK comprised in the first bit block does not comprise a HARQ-ACK of an SPS PDSCH reception.

In one embodiment, the first signaling is received after the second signaling, or the first signaling is not received after the second signaling.

Embodiment 2

Figure 2:
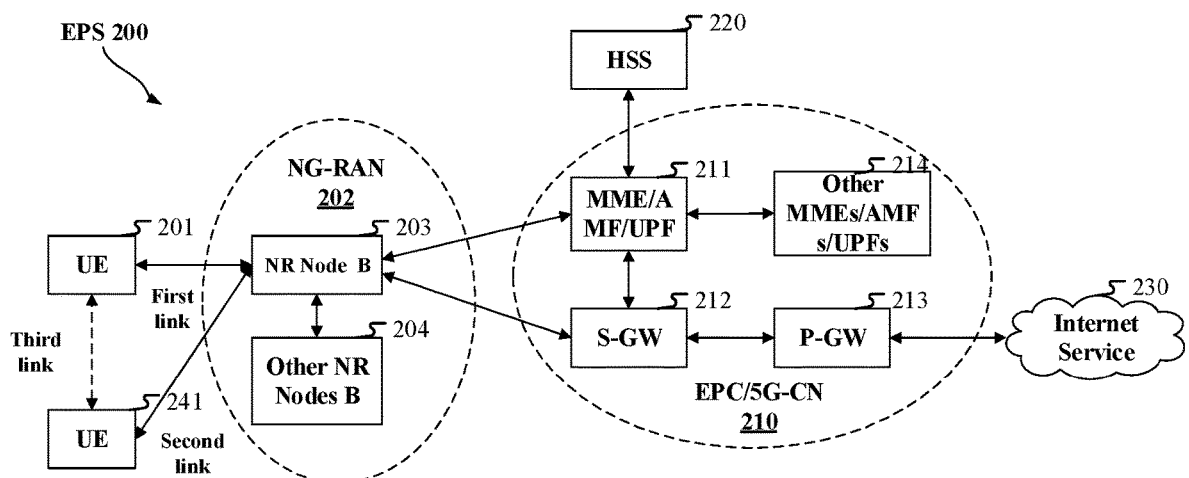
FIG. 2 illustrates a schematic diagram of a network architecture according to one embodiment of the present application.

Embodiment 2 illustrates a schematic diagram of a network architecture according to the present application, as shown in FIG. 2.

FIG. 2 is a diagram illustrating a network architecture 200 of 5G NR. Long-Term Evolution (LTE) and Long-Term Evolution Advanced (LTE-A) systems. The 5G NR or LTE network architecture 200 may be called an Evolved Packet System (EPS) 200 or other suitable terminology. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present application can be extended to networks providing circuit switching services or other cellular networks. The NG-RAN 202 comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones. Session Initiation Protocol (SIP) phones, laptop computers. Personal Digital Assistant (PDA). Satellite Radios, non-terrestrial base station communications, satellite mobile communications. Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an SI/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally: the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the first node in the present application.

In one embodiment, the UE 241 corresponds to the second node in the present application.

In one embodiment, the gNB203 corresponds to the second node in the present application.

In one embodiment, the UE 241 corresponds to the first node in the present application.

In one embodiment, the UE 201 corresponds to the second node in the present application.

Embodiment 3

Figure 3:
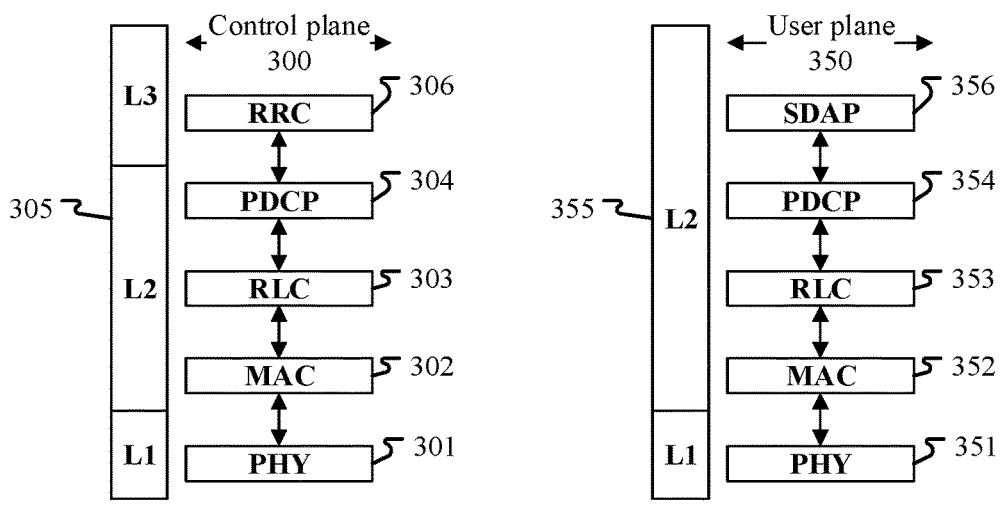
FIG. 3 illustrates a schematic diagram of a radio protocol architecture of a user plane and a control plane according to one embodiment of the present application.

Embodiment 3 illustrates a schematic diagram of a radio protocol architecture of a user plane and a control plane according to the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB. UE, or RSU in V2X), or between two UEs, is represented by three layers, which are a layer 1, a layer 2 and a layer 3, respectively. The layer 1 (L1) is the lowest layer which performs signal processing functions of various PHY layers. The L1 is called PHY 301 in the present application. The layer 2 (L2) 305 is above the PHY 301, and is in charge of the link between the first communication node and the second communication node or between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication nodes of the network side. The PDCP sublayer 304 provides multiplexing among variable radio bearers and logical channels. The PDCP sublayer 304 provides security by encrypting a packet and provides support for handover of a first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300. The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the first bit block in the present application is generated by the RRC sublayer 306.

In one embodiment, the first bit block in the present application is generated by the MAC sublayer 302.

In one embodiment, the first bit block in the present application is generated by the MAC sublayer 352.

In one embodiment, the first bit block in the present application is generated by the PHY 301.

In one embodiment, the first bit block in the present application is generated by the PHY 351.

In one embodiment, the second bit block in the present application is generated by the RRC sublayer 306.

In one embodiment, the second bit block in the present application is generated by the SDAP sublayer 356.

In one embodiment, the second bit block in the present application is generated by the MAC sublayer 302.

In one embodiment, the second bit block in the present application is generated by the MAC sublayer 352.

In one embodiment, the second bit block in the present application is generated by the PHY 301.

In one embodiment, the second bit block in the present application is generated by the PHY 351.

In one embodiment, the first signaling in the present application is generated by the RRC sublayer 306.

In one embodiment, the first signaling in the present application is generated by the MAC sublayer 302.

In one embodiment, the first signaling in the present application is generated by the MAC sublayer 352.

In one embodiment, the first signaling in the present application is generated by the PHY 301.

In one embodiment, the first signaling in the present application is generated by the PHY 351.

In one embodiment, the second signaling in the present application is generated by the RRC sublayer 306.

In one embodiment, the second signaling in the present application is generated by the MAC sublayer 302.

In one embodiment, the second signaling in the present application is generated by the MAC sublayer 352.

In one embodiment, the second signaling in the present application is generated by the PHY 301.

In one embodiment, the second signaling in the present application is generated by the PHY 351.

In one embodiment, a signaling in the first signaling group in the present application is generated by the RRC sublayer 306.

In one embodiment, a signaling in the first signaling group in the present application is generated by the MAC sublayer 302.

In one embodiment, a signaling in the first signaling group in the present application is generated by the MAC sublayer 352.

In one embodiment, a signaling in the first signaling group in the present application is generated by the PHY 301.

In one embodiment, a signaling in the first signaling group in the present application is generated by the PHY 351.

Embodiment 4

Figure 4:
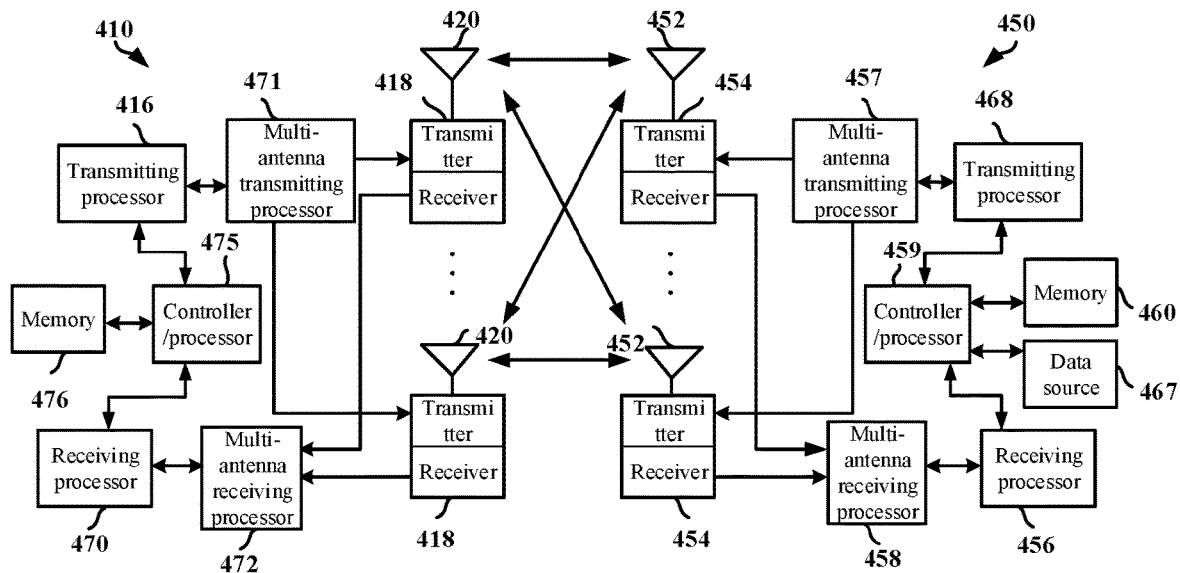
FIG. 4 illustrates a schematic diagram of a first communication device and a second communication device according to one embodiment of the present application.

Embodiment 4 illustrates a schematic diagram of a first communication device and a second communication device according to the present application, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 provides functions of the L2 layer. In the transmission from the first communication device 410 to the second communication device 450, the controller/processor 475 provides header compression, encryption, packet segmentation and reordering, and multiplexing between a logical channel and a transport channel, and radio resource allocation of the second communication device 450 based on various priorities. The controller/processor 475 is also in charge of a retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts baseband multicarrier symbol streams which have gone through reception analog precoding/beamforming operations from time domain to frequency domain using FFT. In frequency domain, physical layer data signals and reference signals are de-multiplexed by the receiving processor 456, where the reference signals are used for channel estimation while data signals are processed in the multi-antenna receiving processor 458 by multi-antenna detection to recover any spatial stream targeting the second communication device 450. Symbols on each spatial stream are demodulated and recovered in the receiving processor 456 to generate a soft decision. Then the receiving processor 456 decodes and de-interleaves the soft decision to recover the higher-layer data and control signal transmitted by the first communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In the transmission from the first communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer. Or various control signals can be provided to the L3 for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication node 410 to the second communication node 450, the controller/processor 459 performs header compression, encryption, packet segmentation and reordering, and multiplexing between a logical channel and a transport channel based on radio resource allocation of the first communication device 410 so as to provide the L2 layer functions used for the user plane and the control plane. The controller/processor 459 is also responsible for a retransmission of a lost packet, and a signaling to the first communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission between the second communication device 450 and the first communication device 410, the controller/processor 475 provides de-multiplexing between a transport channel and a logical channel, packet reassembling, decrypting, header decompression, control signal processing so as to recover a higher-layer packet from the second communication device (UE) 450. The higher-layer packet coming from the controller/processor 475 may be provided to the core network.

In one embodiment, the first node in the present application comprises the second communication device 450, and the second node in the present application comprises the first communication device 410.

In one subembodiment, the first node is a UE, and the second node is a UE.

In one subembodiment, the first node is a UE, and the second node is a relay node.

In one subembodiment, the first node is a relay node, and the second node is a UE.

In one subembodiment, the first node is a UE, and the second node is a base station.

In one subembodiment, the first node is a relay node, and the second node is a base station.

In one subembodiment, the second communication device 450 comprises: at least one controller/processor; the at least one controller/processor is in charge of HARQ operation.

In one subembodiment, the first communication device 410 comprises: at least one controller/processor; the at least one controller/processor is in charge of HARQ operation.

In one subembodiment, the first communication device 410 comprises: at least one controller/processor; the at least one controller/processor is in charge of error detections using ACK and/or NACK protocols to support HARQ operation.

In one embodiment, the second communication device 450 comprises at least one processor and at least one memory, the at least one memory comprises computer program codes; the at least one memory and the computer program codes are configured to be used in collaboration with the at least one processor. The second communication device 450 at least: receives the first signaling in the present application and the second signaling in the present application; and transmits the first signal in the present application in the target radio resource block in the present application, the first signal carrying the first bit block in the present application; herein, the first signaling is used to determine the first bit block, and the first signaling is used to determine the first radio resource block in the present application: the second signaling is used to determine the second radio resource block in the present application, the second radio resource block being reserved for the second bit block in the present application: the first radio resource block and the second radio resource block are overlapping in time domain; the target radio resource block is one of the first radio resource block or the second radio resource block; the first bit block comprises at least one of the first-type information bit(s) in the present application or the second-type information bit(s) in the present application: the second signaling comprises the first field in the present application: when the first bit block does not comprise the first-type information bit(s), a field comprised in the second signaling is used to determine a total number of bits comprised in the first bit block; when the first bit block comprises the first-type information bit(s), a temporal order in which the first signaling and the second signaling are received is used to determine a relation between the first field in the second signaling and the total number of bits comprised in the first bit block.

In one subembodiment, the second communication device 450 corresponds to the first node in the present application.

In one embodiment, the second communication device 450 comprises a memory that stores a computer readable instruction program, the computer readable instruction program generates actions when executed by at least one processor, which include: receiving the first signaling in the present application and the second signaling in the present application; and transmitting the first signal in the present application in the target radio resource block in the present application, the first signal carrying the first bit block in the present application: herein the first signaling is used to determine the first bit block, and the first signaling is used to determine the first radio resource block in the present application; the second signaling is used to determine the second radio resource block in the present application, the second radio resource block being reserved for the second bit block in the present application: the first radio resource block and the second radio resource block are overlapping in time domain; the target radio resource block is one of the first radio resource block or the second radio resource block; the first bit block comprises at least one of the first-type information bit(s) in the present application or the second-type information bit(s) in the present application; the second signaling comprises the first field in the present application: when the first bit block does not comprise the first-type information bit(s), a field comprised in the second signaling is used to determine a total number of bits comprised in the first bit block; when the first bit block comprises the first-type information bit(s), a temporal order in which the first signaling and the second signaling are received is used to determine a relation between the first field in the second signaling and the total number of bits comprised in the first bit block.

In one subembodiment, the second communication device 450 corresponds to the first node in the present application.

In one embodiment, the first communication device 410 comprises at least one processor and at least one memory, the at least one memory comprises computer program codes: the at least one memory and the computer program codes are configured to be used in collaboration with the at least one processor. The first communication device 410 at least: transmits the first signaling in the present application and the second signaling in the present application; and receives the first signal in the present application in the target radio resource block in the present application, the first signal carrying the first bit block in the present application: herein, the first signaling is used to determine the first bit block, and the first signaling is used to determine the first radio resource block in the present application: the second signaling is used to determine the second radio resource block in the present application, the second radio resource block being reserved for the second bit block in the present application: the first radio resource block and the second radio resource block are overlapping in time domain; the target radio resource block is one of the first radio resource block or the second radio resource block; the first bit block comprises at least one of the first-type information bit(s) in the present application or the second-type information bit(s) in the present application: the second signaling comprises the first field in the present application: when the first bit block does not comprise the first-type information bit(s), a field comprised in the second signaling is used to determine a total number of bits comprised in the first bit block; when the first bit block comprises the first-type information bit(s), a temporal order in which the first signaling and the second signaling are received is used to determine a relation between the first field in the second signaling and the total number of bits comprised in the first bit block.

In one subembodiment, the first communication device 410 corresponds to the second node in the present application.

In one embodiment, the first communication device 410 comprises a memory that stores a computer readable instruction program, the computer readable instruction program generates actions when executed by at least one processor, which include: transmitting the first signaling in the present application and the second signaling in the present application; and receiving the first signal in the present application in the target radio resource block in the present application, the first signal carrying the first bit block in the present application: herein, the first signaling is used to determine the first bit block, and the first signaling is used to determine the first radio resource block in the present application: the second signaling is used to determine the second radio resource block in the present application, the second radio resource block being reserved for the second bit block in the present application: the first radio resource block and the second radio resource block are overlapping in time domain; the target radio resource block is one of the first radio resource block or the second radio resource block; the first bit block comprises at least one of the first-type information bit(s) in the present application or the second-type information bit(s) in the present application; the second signaling comprises the first field in the present application: when the first bit block does not comprise the first-type information bit(s), a field comprised in the second signaling is used to determine a total number of bits comprised in the first bit block; when the first bit block comprises the first-type information bit(s), a temporal order in which the first signaling and the second signaling are received is used to determine a relation between the first field in the second signaling and the total number of bits comprised in the first bit block.

In one subembodiment, the first communication device 410 corresponds to the second node in the present application.

In one embodiment, at least one of the antenna 452, the receiver 454, the multi-antenna receiving processor 458, the receiving processor 456, the controller/processor 459, the memory 460, or the data source 467 is used for receiving the first signaling in the present application.

In one embodiment, at least one of the antenna 420, the transmitter 418, the multi-antenna transmitting processor 471, the transmitting processor 416, the controller/processor 475 or the memory 476 is used for transmitting the first signaling in the present application.

In one embodiment, at least one of the antenna 452, the receiver 454, the multi-antenna receiving processor 458, the receiving processor 456, the controller/processor 459, the memory 460, or the data source 467 is used for receiving the first signaling group in the present application.

In one embodiment, at least one of the antenna 420, the transmitter 418, the multi-antenna transmitting processor 471, the transmitting processor 416, the controller/processor 475 or the memory 476 is used for transmitting the first signaling group in the present application.

In one embodiment, at least one of the antenna 452, the receiver 454, the multi-antenna receiving processor 458, the receiving processor 456, the controller/processor 459, the memory 460, or the data source 467 is used for receiving the second signaling in the present application.

In one embodiment, at least one of the antenna 420, the transmitter 418, the multi-antenna transmitting processor 471, the transmitting processor 416, the controller/processor 475 or the memory 476 is used for transmitting the second signaling in the present application.

In one embodiment, at least one of the antenna 452, the transmitter 454, the multi-antenna transmitting processor 458, the transmitting processor 468, the controller/processor 459, the memory 460, or the data source 467 is used for transmitting the first signal in the present application in the target radio resource block in the present application.

In one embodiment, at least one of the antenna 420, the receiver 418, the multi-antenna receiving processor 472, the receiving processor 470, the controller/processor 475 or the memory 476 is used for receiving the first signal in the present application in the target radio resource block in the present application.

Embodiment 5

Figure 5:
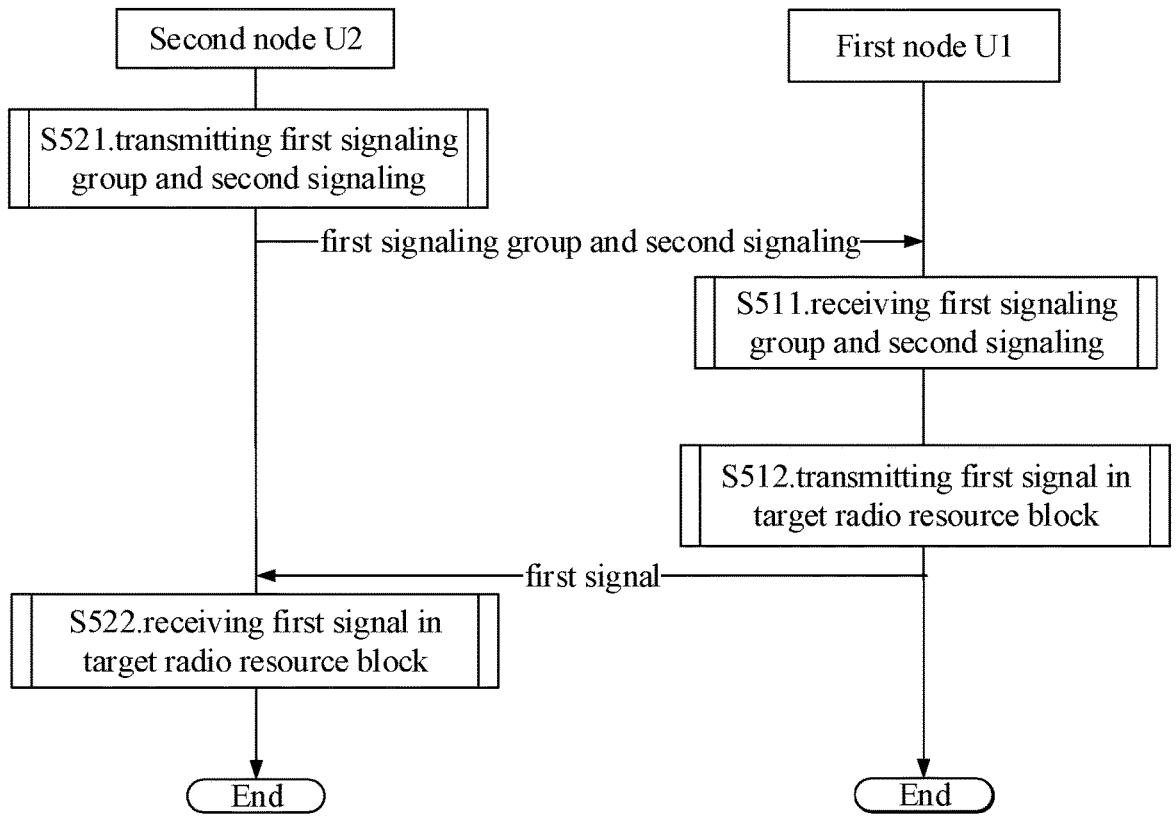
FIG. 5 illustrates a flowchart of signal transmission according to one embodiment of the present application.

Embodiment 5 illustrates a flowchart of radio signal transmission according to one embodiment of the present application, as shown in FIG. 5. In FIG. 5, a first node U1 and a second node U2 are in communications via an air interface.

The first node U1 receives a first signaling group and a second signaling in step S511; and transmits a first signal in a target radio resource block in step S512.

The second node U2 transmits a first signaling group and a second signaling in step S521; and receives a first signal in a target radio resource block in step S522.

In Embodiment 5, the first signal carries a first bit block; each signaling in the first signaling group is used to determine the first bit block; a first signaling is a last one of signalings in the first signaling group; the first signaling is used to determine the first bit block, and the first signaling is used to determine a first radio resource block; the second signaling is used to determine a second radio resource block, the second radio resource block being reserved for a second bit block; the first radio resource block and the second radio resource block are overlapping in time domain; the first bit block comprises at least one of first-type information bit(s) or second-type information bit(s); the second signaling comprises a first field; when the first bit block does not comprise the first-type information bit(s), a field comprised in the second signaling is used to determine a total number of bits comprised in the first bit block; when the first bit block comprises the first-type information bit(s), a temporal order in which the first signaling and the second signaling are received is used to determine a relation between the first field in the second signaling and the total number of bits comprised in the first bit block; the target radio resource block is the second radio resource block; the first signal carries the second bit block; the first signaling and the second signaling are respectively used to determine an index in a first index set; the first index set comprises a first index and a second index; the first-type information bit(s) corresponds (correspond) to the first index, while the second-type information bit(s) corresponds (correspond) to the second index; the second signaling is used to determine the second index.

In one subembodiment of Embodiment 5, when the first bit block comprises the first-type information bit; the temporal order in which the first signaling and the second signaling are received is used to determine whether the first field in the second signaling is used to determine the total number of bits comprised in the first bit block; when the first bit block comprises the first-type information bit and the first signaling is not received after the second signaling, the first field in the second signaling is used to determine the total number of bits comprised in the first bit block; when the first bit block comprises the first-type information bit and the first signaling is received after the second signaling, the first field in the second signaling is not used to determine the total number of bits comprised in the first bit block.

In one subembodiment of Embodiment 5, when the first bit block comprises the first-type information bit; the temporal order in which the first signaling and the second signaling are received is used to determine whether the first field in the second signaling is used to determine the total number of bits comprised in the first bit block or is at most used to determine a total number of bits comprised in a bit sub-block comprised in the first bit block.

In one subembodiment, the first signaling group only comprises the first signaling in the present application.

In one subembodiment, the first signaling group also comprises a signaling other than the first signaling in the present application.

In one embodiment, the first node U1 is the first node in the present application.

In one embodiment, the second node U2 is the second node in the present application.

In one embodiment, the first node U1 is a UE.

In one embodiment, the second node U2 is a base station.

In one embodiment, the second node U2 is a UE.

In one embodiment, an air interface between the second node U2 and the first node U1 is a Uu interface.

In one embodiment, an air interface between the second node U2 and the first node U1 includes a cellular link.

In one embodiment, an air interface between the second node U2 and the first node U1 is a PC5 interface.

In one embodiment, an air interface between the second node U2 and the first node U1 includes a sidelink.

In one embodiment, an air interface between the second node U2 and the first node U1 includes a radio interface between a base station and a UE.

In one embodiment, when the first bit block does not comprise the first-type information bit; the first signaling is not received after the second signaling, the first field comprised in the second signaling being used to determine a total number of the second-type information bit(s) comprised in the first bit block.

In one embodiment, when the first bit block comprises the first-type information bit and the first signaling is received before the second signaling, the first field in the second signaling is used to determine the total number of bits comprised in the first bit block; when the first bit block comprises the first-type information bit and the first signaling is not received before the second signaling, the first field in the second signaling is not used to determine the total number of bits comprised in the first bit block.

In one embodiment, the phrase of being not received before the second signaling comprises: being received only after the second signaling is received.

In one embodiment, the phrase of being not received before the second signaling comprises: being received in a third monitoring occasion; the third monitoring occasion is after a monitoring occasion in which the second signaling is received.

In one embodiment, the phrase of being not received before the second signaling comprises: being received in a third monitoring occasion; the third monitoring occasion is after a monitoring occasion in which the second signaling is received, or, the first monitoring occasion is a monitoring occasion in which the second signaling is received.

In one embodiment, the phrase of being not received before the second signaling comprises: being received in a third monitoring occasion; a monitoring occasion in which the second signaling is received is a monitoring occasion earlier than the third monitoring occasion.

In one embodiment, the phrase of being not received after the second signaling comprises: being received in a third monitoring occasion; a monitoring occasion in which the second signaling is received is a monitoring occasion earlier than the third monitoring occasion, or, the third monitoring occasion is a monitoring occasion in which the second signaling is received.

In one embodiment, the phrase of being received before the second signaling comprises: being received before the second signaling is received.

In one embodiment, the phrase of being received before the second signaling comprises: being received in a fourth monitoring occasion; the fourth monitoring occasion is before a monitoring occasion in which the second signaling is received.

In one embodiment, the phrase of being received before the second signaling comprises: being received in a fourth monitoring occasion; the fourth monitoring occasion is a monitoring occasion earlier than that in which the second signaling is received.

In one embodiment, when the target radio resource block is the second radio resource block, the first signal carries the second bit block.

In one embodiment, the first signal carries the second bit block; the first signal comprises an output by all or part of bits in the second bit block sequentially through some or all of CRC Insertion. Segmentation. Code Block (CB)-level CRC Insertion. Channel Coding. Rate Matching. Concatenation. Scrambling. Modulation. Layer Mapping. Precoding, Mapping to Resource Element. Multicarrier Symbol Generation, and Modulation and Upconversion.

In one embodiment, the first signal carries the first bit block and the second bit block; the first signal comprises an output by all or part of bits in the first bit block and the second bit block sequentially through some or all of CRC Insertion, Segmentation, Code Block (CB)-level CRC Insertion, Channel Coding, Rate Matching, Concatenation, Scrambling, Modulation, Layer Mapping, Precoding, Mapping to Resource Element, Multicarrier Symbol Generation, and Modulation and Upconversion.

In one embodiment, the second bit block corresponds to the second index.

In one embodiment, the second radio resource block is reserved for a second channel.

In one embodiment, the second radio resource block comprises radio resources occupied by the second channel.

In one embodiment, the second channel comprises a physical layer channel.

In one embodiment, the second channel comprises a PUSCH.

In one embodiment, the second channel is reserved for the second bit block.

In one embodiment, all conditions in a second condition set are satisfied in the present application.

In one embodiment, the second condition set comprises: one or more conditions required to be satisfied for the first bit block being multiplexed in the second channel.

In one embodiment, the second condition set comprises: a timeline condition required to be satisfied for the first bit block being multiplexed in the second channel.

In one embodiment, the second condition set comprises: all timeline conditions required to be satisfied for the first bit block being multiplexed in the second channel.

In one embodiment, the second condition set comprises: all conditions required to be satisfied for the first bit block being multiplexed in the second channel other than a first condition.

In one embodiment, the second condition set comprises: all timeline conditions required to be satisfied for the first bit block being multiplexed in the second channel other than a first condition.

In one embodiment, the first condition is related to a temporal order in which the first signaling and the second signaling are received.

In one embodiment, the first condition is that the first signaling is not received after the second signaling.

In one embodiment, the first condition is that the first signaling is received after the second signaling.

In one embodiment, the second condition set comprises one or more conditions related to a requirement of delay.

In one embodiment, the second condition set comprises all timeline conditions related to a requirement of delay.

In one embodiment, the detailed description of the timeline conditions in the present application can be found in 3GPP TS38.213, Section 9.2.5.

In one embodiment, conditions in the second condition set include: one or more timeline conditions related to a first multicarrier symbol in an earliest radio resource block in a second radio resource block group.

In one embodiment, conditions in the second condition set include: a time gap between a second time and a start time of a first multicarrier symbol in an earliest radio resource block in a second radio resource block group is no smaller than a third value: the second time is earlier than the start time of the first multicarrier symbol in the earliest radio resource block in the second radio resource block group.

In one subembodiment, the third value is related to UE's processing time.

In one subembodiment, the third value is related to UE's processing capability.

In one subembodiment, the third value is related to UE's PDSCH processing capability.

In one subembodiment, the third value is related to UE's PUSCH processing capability.

In one subembodiment, the third value is related to at least one of $$T_{proc,1}^{mux}, T_{proc,release}^{mux}, T_{proc,CSI}^{mux} \text{ or } T_{proc,2}^{mux},$$

for the specific definitions of the $$T_{proc,1}^{mux} \text{ the } T_{proc,release}^{mux}, \text{ the } T_{proc,CSI}^{mux} \text{ and the } T_{proc,2}^{mux},$$

refer to 3GPP TS38.213, Section 9.2.5.

In one subembodiment, the third value is equal to at least one of $$T_{proc,1}^{mux}, T_{proc,release}^{mux}, T_{proc,CSI}^{mux} \text{ or } T_{proc,2}^{mux},$$

for the specific definitions of the $$T_{proc,1}^{mux} \text{ the } T_{proc,release}^{mux}, \text{ the } T_{proc,CSI}^{mux} \text{ and the } T_{proc,2}^{mux},$$

refer to 3GPP TS38.213, Section 9.2.5.

In one subembodiment, the second time is no earlier than an end time of time-domain resources occupied by a transmission of the second signaling.

In one subembodiment, the second time is no earlier than an end time of time-domain resources occupied by a PDCCH used for transmitting the second signaling.

In one subembodiment, the second time is no earlier than an end time of time-domain resources occupied by a transmission of the second signaling, or the second time is no earlier than an end time of time-domain resources occupied by a transmission of a bit block scheduled by the first signaling.

In one subembodiment, the second time is no earlier than an end time of time-domain resources occupied by a PDCCH used for transmitting the second signaling, or, the second time is no earlier than an end time of time-domain resources occupied by a PDSCH used for transmitting a bit block scheduled by the first signaling.

In one embodiment, the second radio resource group in the present application comprises the second radio resource block.

In one embodiment, the second radio resource group in the present application comprises the first radio resource block and the second radio resource block.

Embodiment 6

Figure 6:
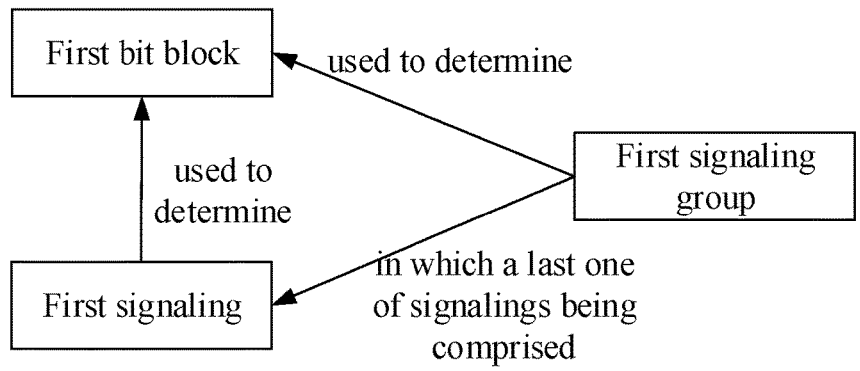
FIG. 6 illustrates a schematic diagram of relations among a first signaling group, a first signaling and a first bit block according to one embodiment of the present application.

Embodiment 6 illustrates a schematic diagram of relations among a first signaling group, a first signaling and a first bit block according to one embodiment of the present application, as shown in FIG. 6.

In Embodiment 6, each signaling in a first signaling group is used to determine a first bit block; a first signaling is a last one of signalings in the first signaling group.

In one embodiment, a signaling in the first signaling group is dynamically configured.

In one embodiment, a signaling in the first signaling group comprises a layer 1 (L1) signaling.

In one embodiment, a signaling in the first signaling group comprises a layer 1 (L1) control signaling.

In one embodiment, a signaling in the first signaling group comprises a physical layer signaling.

In one embodiment, a signaling in the first signaling group comprises one or more fields in a physical layer signaling.

In one embodiment, a signaling in the first signaling group comprises a higher layer signaling.

In one embodiment, a signaling in the first signaling group comprises one or more fields in a higher layer signaling.

In one embodiment, a signaling in the first signaling group comprises an RRC signaling.

In one embodiment, a signaling in the first signaling group comprises a MAC CE signaling.

In one embodiment, a signaling in the first signaling group comprises one or more fields in an RRC signaling.

In one embodiment, a signaling in the first signaling group comprises one or more fields in a MAC CE signaling.

In one embodiment, a signaling in the first signaling group comprises DCI.

In one embodiment, a signaling in the first signaling group comprises one or more fields in a DCI.

In one embodiment, a signaling in the first signaling group comprises SCI.

In one embodiment, a signaling in the first signaling group comprises one or more fields in an SCI.

In one embodiment, a signaling in the first signaling group comprises one or more fields in an IE.

In one embodiment, a signaling in the first signaling group is a downlink scheduling signaling.

In one embodiment, a signaling in the first signaling group is transmitted in a downlink physical layer control channel (i.e., a downlink channel only capable of bearing physical layer signaling).

In one embodiment, a signaling in the first signaling group is DCI format 1_0, for the specific definition of the DCI format 1_0, refer to 3GPP TS38.212. Chapter 7.3.1.2.

In one embodiment, a signaling in the first signaling group is DCI format 1_1, for the specific definition of the DCI format 1_1, refer to 3GPP TS38.212. Chapter 7.3.1.2.

In one embodiment, a signaling in the first signaling group is DCI format 1_2, for the specific definition of the DCI format 1_2, refer to 3GPP TS38.212. Chapter 7.3.1.2.

In one embodiment, a signaling in the first signaling group is a signaling used for scheduling a downlink physical layer data channel.

In one embodiment, the statement that the first signaling is a last one of signalings in the first signaling group means that all signalings in the first signaling group are indexed following a second rule, where the first signaling is a signaling with a largest index in the first signaling group.

In one embodiment, the second rule is a default rule.

In one embodiment, the second rule is a rule configured by a higher layer signaling.

In one embodiment, the first signaling group comprises a positive integer number of signaling(s).

In one embodiment, the first signaling group comprises one signaling.

In one embodiment, the first signaling group comprises multiple signalings.

In one embodiment, the first signaling group only comprises the first signaling.

In one embodiment, the first signaling group also comprises a signaling other than the first signaling.

In one embodiment, each signaling in the first signaling group is received after the second signaling, or, each signaling in the first signaling group is not received after the second signaling.

In one subembodiment, the case where some signalings in the first signaling group are received after the second signaling and the other signalings in the first signaling group are not received after the second signaling is not included in the Embodiment.

In one embodiment, each signaling in the first signaling group is received after the second signaling, or, no signaling in the first signaling group is received after the second signaling, or, some signalings in the first signaling group are received after the second signaling and the other signalings in the first signaling group are not received after the second signaling.

In one embodiment, the first bit block comprises a first bit sub-block group; the first signaling group comprises one or multiple signaling sub-groups: each signaling sub-group comprised in the first signaling group is respectively used to determine each bit sub-block in the first bit sub-block group.

In one embodiment, the first bit block comprises a first bit sub-block group; each signaling in a signaling sub-group comprised in the first signaling group is used to determine a bit sub-block in the first bit sub-block group.

In one subembodiment, the bit sub-block in the first bit sub-block group comprises information indicating whether a signaling in the signaling sub-group comprised in the first signaling group is correctly received, or, the bit sub-block in the first bit sub-block group comprises information indicating whether a bit block transmitted on a channel scheduled by a signaling in the signaling sub-group comprised in the first signaling group is correctly received.

In one subembodiment, a signaling in the signaling sub-group comprised in the first signaling group is used to indicate a Semi-Persistent Scheduling (SPS) Release, and the bit sub-block in the first bit sub-block group comprises a HARQ-ACK indicating whether the first signaling is correctly received: or, the bit sub-block in the first bit sub-block group comprises a HARQ-ACK indicating whether a bit block transmitted on a PDSCH scheduled by a signaling in the signaling sub-group comprised in the first signaling group is correctly received.

In one embodiment, a bit sub-block in the first bit sub-block group comprises a HARQ-ACK.

In one embodiment, a bit sub-block in the first bit sub-block group comprises a positive integer number of bit(s).

In one embodiment, a bit sub-block in the first bit sub-block group comprises a positive integer number of ACK(s) or NACK(s).

In one embodiment, a bit sub-block in the first bit sub-block group comprises the first-type information bit or the second-type information bit.

Embodiment 7

Figure 7:
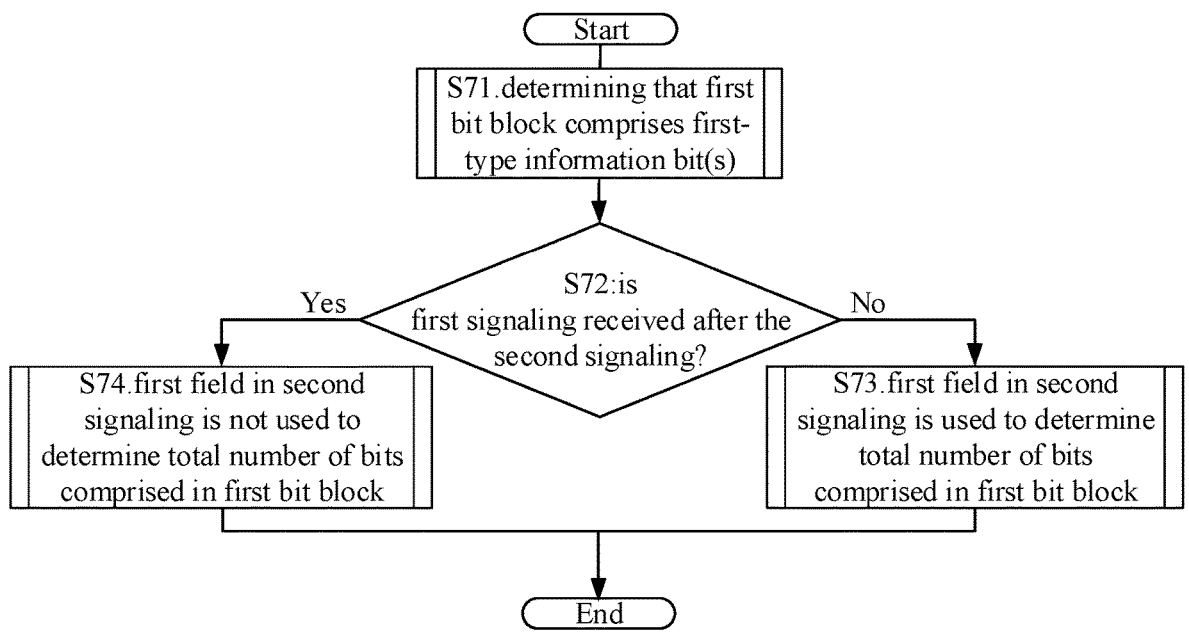
FIG. 7 illustrates a schematic diagram of procedures of determining whether a first field in a second signaling is used to determine a total number of bits comprised in a first bit block.

Embodiment 7 illustrates a schematic diagram of procedures of determining whether a first field in a second signaling is used to determine a total number of bits comprised in a first bit block, as shown in FIG. 7.

In Embodiment 7, the first node in the present application determines in step S71 that a first bit block comprises a first-type information bit; and moves forward to step S72 to determine whether a first signaling is received after a second signaling; If so, move forward to step S74 to determine that a first field in the second signaling is not used to determine a total number of bits comprised in the first bit block; If not, move forward to step S73 to determine that the first field in the second signaling is used to determine a total number of bits comprised in the first bit block.

In one embodiment, when the first bit block comprises the first-type information bit and the first signaling is not received after the second signaling, the first field in the second signaling is used to determine the total number of bits comprised in the first bit block; when the first bit block comprises the first-type information bit and the first signaling is received after the second signaling, the first field in the second signaling is not used to determine the total number of bits comprised in the first bit block.

In one embodiment, when the first field in the second signaling is not used to determine a total number of bits comprised in the first bit block; a field comprised in the first signaling is used to determine a total number of bits comprised in the first bit block.

In one subembodiment, the field comprised in the first signaling comprises a DAI field in the first signaling.

In one subembodiment, the field comprised in the first signaling indicates a total DAI.

In one subembodiment, the field comprised in the first signaling comprises a positive integer number of bit(s) in a DAI field in the first signaling.

In one subembodiment, names of the field comprised in the first signaling include downlink assignment index.

In one embodiment, the sentence that the first field in the second signaling is used to determine the total number of bits comprised in the first bit block comprises: the first field in the second signaling being used for performing calculation to determine a total number of bits comprised in the first bit block.

In one embodiment, the sentence that the first field in the second signaling is used to determine the total number of bits comprised in the first bit block comprises: a value indicated by the first field in the second signaling being an input to a procedure in which the first node performs calculation to determine a total number of bits comprised in the first bit block.

In one embodiment, the sentence that the first field in the second signaling is used to determine the total number of bits comprised in the first bit block comprises: In a procedure that the first node generates a HARQ-ACK codebook comprised in the first bit block based on a piece of pseudo-code, a first parameter is set as equal to a value indicated by the first field in the second signaling for determining a total number of bits comprised in the first bit block.

In one subembodiment, the piece of pseudo-code refers to the pseudo-code used for HARQ-ACK codebook generation in 3GPP TS38.213, Section 9.1.3.1.

In one subembodiment, the piece of pseudo-code refers to the pseudo-code used for HARQ-ACK codebook generation of the first-type HARQ-ACK in 3GPP TS38.213, Section 9.1.3.1.

In one subembodiment, the first parameter is an intermediate variable in the procedure of generating a HARQ-ACK codebook comprised in the first bit block.

In one subembodiment, the first parameter is a Vtemp2 in 3GPP TS38.213, Section 9.1.3.1.

In one subembodiment, the value indicated by the first field in the second signaling is equal to a value indicated by a positive integer number of bit(s) in a DAI field.

In one subembodiment, the value indicated by the first field in the second signaling is equal to $V_{DAI}^{UL}$ in 3GPP TS38.213, Section 9.1.3.2.

In one subembodiment, the sentence that the first field in the second signaling is not used to determine the total number of bits comprised in the first bit block comprises: the total number of bits comprised in the first bit block is unrelated to the first field in the second signaling.

In one embodiment, the sentence that the first field in the second signaling is not used to determine the total number of bits comprised in the first bit block comprises: a value of the first field in the second signaling being not joined in a procedure that a total number of bits comprised in the first bit block is determined.

In one embodiment, the first signaling is received before the second signaling, or the first signaling is received after the second signaling.

In one embodiment, time-domain resources occupied by the first signaling and time-domain resources occupied by the second signaling are mutually orthogonal.

In one embodiment, the first signaling and the second signaling are respectively received in a monitoring occasion.

In one embodiment, the first signaling is received in a monitoring occasion; the second signaling is received in another monitoring occasion.

In one subembodiment, the monitoring occasion and the other monitoring occasion are orthogonal in time domain.

In one embodiment, the monitoring occasion is a PDCCH monitoring occasion.

In one embodiment, the temporal order in which the first signaling and the second signaling are received includes: a sequential order of time domains in which the first signaling and the second signaling are received.

In one embodiment, the temporal order in which the first signaling and the second signaling are received includes: a sequential order of a monitoring occasion where the first signaling is received and a monitoring occasion where the second signaling is received in time domain.

In one embodiment, when the first bit block does not comprise the first-type HARQ-ACK: the first signaling is not received after the second signaling.

In one embodiment, the phrase of being not received after the second signaling comprises: being received before the second signaling is received.

In one embodiment, the phrase of being not received after the second signaling comprises: being received in a first monitoring occasion; the first monitoring occasion is before a monitoring occasion in which the second signaling is received.

In one embodiment, the phrase of being not received after the second signaling comprises: being received in a first monitoring occasion; the first monitoring occasion is before a monitoring occasion in which the second signaling is received, or, the first monitoring occasion is a monitoring occasion in which the second signaling is received.

In one embodiment, the phrase of being not received after the second signaling comprises: being received in a first monitoring occasion; the first monitoring occasion is a monitoring occasion earlier than that in which the second signaling is received.

In one embodiment, the phrase of being not received after the second signaling comprises: being received in a first monitoring occasion; the first monitoring occasion is a monitoring occasion earlier than a monitoring occasion in which the second signaling is received, or, the first monitoring occasion is a monitoring occasion in which the second signaling is received.

In one embodiment, the phrase of being received after the second signaling comprises: being received only after the second signaling is received.

In one embodiment, the phrase of being received after the second signaling comprises: being received in a second monitoring occasion; the second monitoring occasion is after a monitoring occasion in which the second signaling is received.

In one embodiment, the phrase of being received after the second signaling comprises: being received in a second monitoring occasion; a monitoring occasion in which the second signaling is received is a monitoring occasion earlier than the second monitoring occasion.

Embodiment 8

Figure 8:
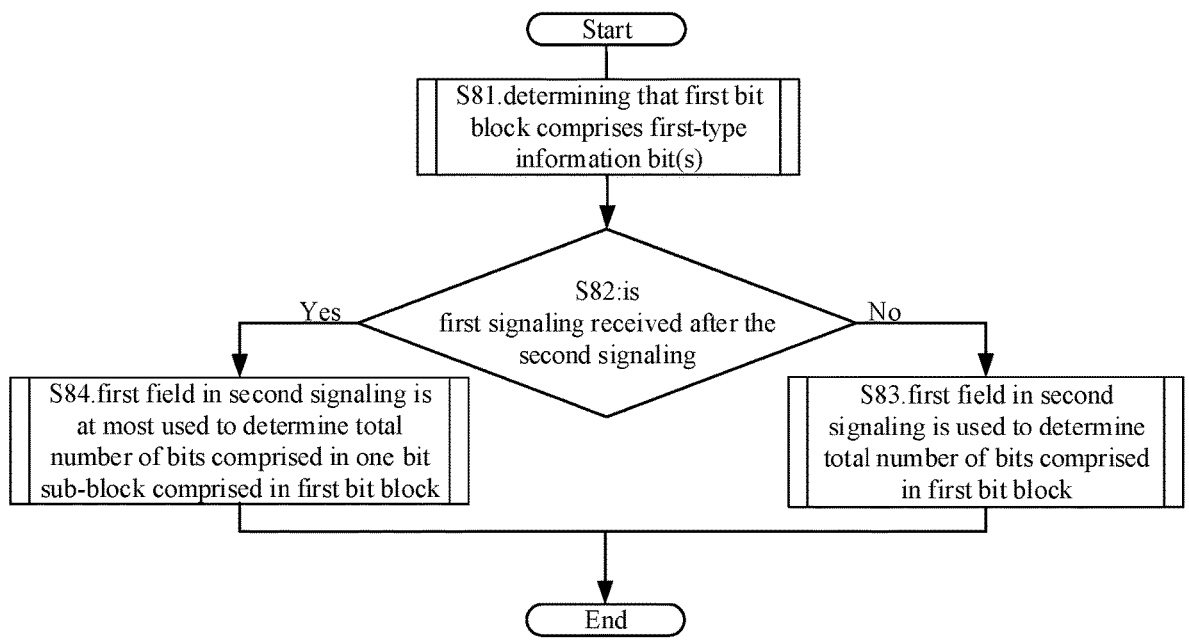
FIG. 8 illustrates a schematic diagram of procedures of determining whether a first field in a second signaling is used to determine a total number of bits comprised in a first bit block or is at most used to determine a total number of bits comprised in a bit sub-block comprised in a first bit block.

Embodiment 8 illustrates a schematic diagram of procedures of determining whether a first field in a second signaling is used to determine a total number of bits comprised in a first bit block or is at most used to determine a total number of bits comprised in a bit sub-block comprised in a first bit block, as shown in FIG. 8.

In Embodiment 8, the first node in the present application determines in step S81 that a first bit block comprises a first-type information bit; and moves forward to step S82 to determine whether a first signaling is received after a second signaling; if so, move forward to step S84 to determine that a first field in the second signaling is at most used to determine a total number of bits comprised in a bit sub-block comprised in the first bit block; If not, move forward to step S83 to determine that the first field in the second signaling is used to determine a total number of bits comprised in the first bit block.

In one embodiment, when the first bit block comprises the first-type information bit; the temporal order in which the first signaling and the second signaling are received is used to determine whether the first field in the second signaling is used to determine the total number of bits comprised in the first bit block or is used to determine a total number of bits comprised in a bit sub-block comprised in the first bit block; when the first field in the second signaling is used to determine a total number of bits comprised in a bit sub-block comprised in the first bit block; the first bit block also comprises another bit sub-block other than the bit sub-block comprised in the first bit block, and a total number of bits comprised in the other bit sub-block other than the bit sub-block comprised in the first bit block is unrelated to the first field in the second signaling.

In one embodiment, when the first bit block comprises the first-type information bit and the first signaling is not received after the second signaling, the first field in the second signaling is used to determine the total number of bits comprised in the first bit block; when the first bit block comprises the first-type information bit and the first signaling is received after the second signaling, the first field in the second signaling is at most used to determine the total number of bits comprised in a bit sub-block comprised in the first bit block.

In one embodiment, when the first bit block comprises the first-type information bit and the first signaling is received before the second signaling, the first field in the second signaling is used to determine the total number of bits comprised in the first bit block; when the first bit block comprises the first-type information bit and the first signaling is not received before the second signaling, the first field in the second signaling is at most used to determine the total number of bits comprised in a bit sub-block comprised in the first bit block.

In one embodiment, the statement that the first field in the second signaling is at most used to determine a total number of bits comprised in a bit sub-block comprised in the first bit block comprises: the first field in the second signaling is used to determine a total number of bits comprised in a bit sub-block comprised in the first bit block.

In one embodiment, the statement that the first field in the second signaling is at most used to determine a total number of bits comprised in a bit sub-block comprised in the first bit block comprises: the first field in the second signaling is used to determine a total number of bits comprised in a bit sub-block comprised in the first bit block; the first bit block also comprises another bit sub-block other than the bit sub-block comprised in the first bit block, and a total number of bits comprised in the other bit sub-block other than the bit sub-block comprised in the first bit block is unrelated to the first field in the second signaling.

In one embodiment, the sentence that the first field in the second signaling is at most used to determine a total number of bits comprised in a bit sub-block comprised in the first bit block comprises: the first field in the second signaling is used to determine a total number of bits comprised in a bit sub-block comprised in the first bit block; the first bit block also comprises another bit sub-block other than the bit sub-block comprised in the first bit block, and a total number of bits comprised in the other bit sub-block other than the bit sub-block comprised in the first bit block is unrelated to the first field in the second signaling.

In one embodiment, the sentence that the first field in the second signaling is at most used to determine a total number of bits comprised in a bit sub-block comprised in the first bit block comprises: the first field in the second signaling is used to determine a total number of bits comprised in a bit sub-block comprised in the first bit block, or, the first field in the second signaling is not used to determine a total number of bits comprised in any bit sub-block comprised in the first bit block.

In one embodiment, the sentence that the first field in the second signaling is at most used to determine a total number of bits comprised in a bit sub-block comprised in the first bit block comprises: the first field in the second signaling is used to determine a total number of bits comprised in a bit sub-block comprised in the first bit block, and the first bit block also comprises another bit sub-block other than the bit sub-block comprised in the first bit block, and a total number of bits comprised in the other bit sub-block other than the bit sub-block comprised in the first bit block is unrelated to the first field in the second signaling; or, the first field in the second signaling is not used to determine a total number of bits comprised in any bit sub-block comprised in the first bit block.

In one embodiment, the sentence that the first field in the second signaling is at most used to determine a total number of bits comprised in a bit sub-block comprised in the first bit block comprises: the first field in the second signaling is used to determine a total number of bits comprised in a bit sub-block comprised in the first bit block, or, a total number of bits comprised in any bit sub-block comprised in the first bit block is unrelated to the first field in the second signaling.

In one embodiment, the sentence that the first field in the second signaling is at most used to determine a total number of bits comprised in a bit sub-block comprised in the first bit block comprises: the first field in the second signaling is used to determine a total number of bits comprised in a bit sub-block comprised in the first bit block, and the first bit block also comprises another bit sub-block other than the bit sub-block comprised in the first bit block, and a total number of bits comprised in the other bit sub-block other than the bit sub-block comprised in the first bit block is unrelated to the first field in the second signaling; or, a total number of bits comprised in any bit sub-block comprised in the first bit block is unrelated to the first field in the second signaling.

In one embodiment, when the first field in the second signaling is used to determine a total number of bits comprised in the first bit block; the first field in the second signaling is used to perform calculation for directly obtaining a total number of bits comprised in the first bit block, rather than being used to perform calculation to determine only a number of partial bits comprised in the first bit block, which is further used to determine a total number of bits comprised in the first bit block.

In one embodiment, when the first field in the second signaling is used to determine a total number of bits comprised in the first bit block; a total number of bits comprised in the first bit block is equal to a third parameter being multiplied by a first intermediate quantity, the first intermediate quantity being equal to a first value multiplied by a first count number further plus a value indicated by the first field in the second signaling.

In one embodiment, the third parameter is equal to 1.
In one embodiment, the third parameter is equal to 2.
In one embodiment, the third parameter is equal to one of 3, 4, 5, 6, 7 or 8.
In one embodiment, the third parameter is less than 256.
In one embodiment, the first value is equal to 4.
In one embodiment, the first value is equal to a value of a parameter in 3GPP TS38.213, Section 9.1.3.1.
In one embodiment, the first value is equal to $T_D$ in 3GPP TS38.213, Section 9.1.3.1.
In one embodiment, the first count number is a variable in 3GPP TS38.213, Section 9.1.3.1.
In one embodiment, the first count number is j in 3GPP TS38.213, Section 9.1.3.1.

In one embodiment, when the first field in the second signaling is used to determine a total number of bits comprised in a bit sub-block comprised in the first bit block; the total number of bits comprised in the bit sub-block comprised in the first bit block is equal to a fourth parameter multiplied by a second intermediate quantity, the second intermediate quantity being equal to a second value multiplied by a second count number plus a value indicated by the first field in the second signaling; a total number of bits comprised in the first bit block is equal to the total number of bits comprised in the bit sub-block comprised in the first bit block.

In one embodiment, the fourth parameter is equal to 1.
In one embodiment, the fourth parameter is equal to 2.
In one embodiment, the fourth parameter is equal to one of 3, 4, 5, 6, 7 or 8.
In one embodiment, the fourth parameter is less than 256.
In one embodiment, the second value is equal to 4.
In one embodiment, the second value is equal to a value of a parameter in 3GPP TS38.213, Section 9.1.3.1.
In one embodiment, the second value is equal to a $T_D$ in 3GPP TS38.213, Section 9.1.3.1.
In one embodiment, the second count number is a variable in 3GPP TS38.213, Section 9.1.3.1.
In one embodiment, the second count number is j in 3GPP TS38.213, Section 9.1.3.1.

In one embodiment, when the first field in the second signaling is used to determine a total number of bits comprised in a bit sub-block comprised in the first bit block; the total number of bits comprised in the first bit block is equal to the total number of bits comprised in the bit sub-block comprised in the first bit block plus the total number of bits comprised in the other bit sub-block other than the bit sub-block comprised in the first bit block; the first field in the second signaling is not used to determine the total number of bits comprised in the other bit sub-block other than the bit sub-block comprised in the first bit block.

In one embodiment, the sentence that the first field in the second signaling is not used to determine the total number of bits comprised in the other bit sub-block other than the bit sub-block comprised in the first bit block comprises: the total number of bits comprised in the other bit sub-block other than the bit sub-block comprised in the first bit block being unrelated to the first field in the second signaling.

In one embodiment, the first signaling group in the present application comprises a first signaling sub-group and a second signaling sub-group; each signaling in the first signaling sub-group is received after the second signaling, while no signaling in the second signaling sub-group is received after the second signaling; a signaling in the second signaling sub-group is used to determine the bit sub-block comprised in the first bit block, while a signaling in the first signaling sub-group is used to determine the other bit sub-block other than the bit sub-block comprised in the first bit block.

Embodiment 9

Figure 9:
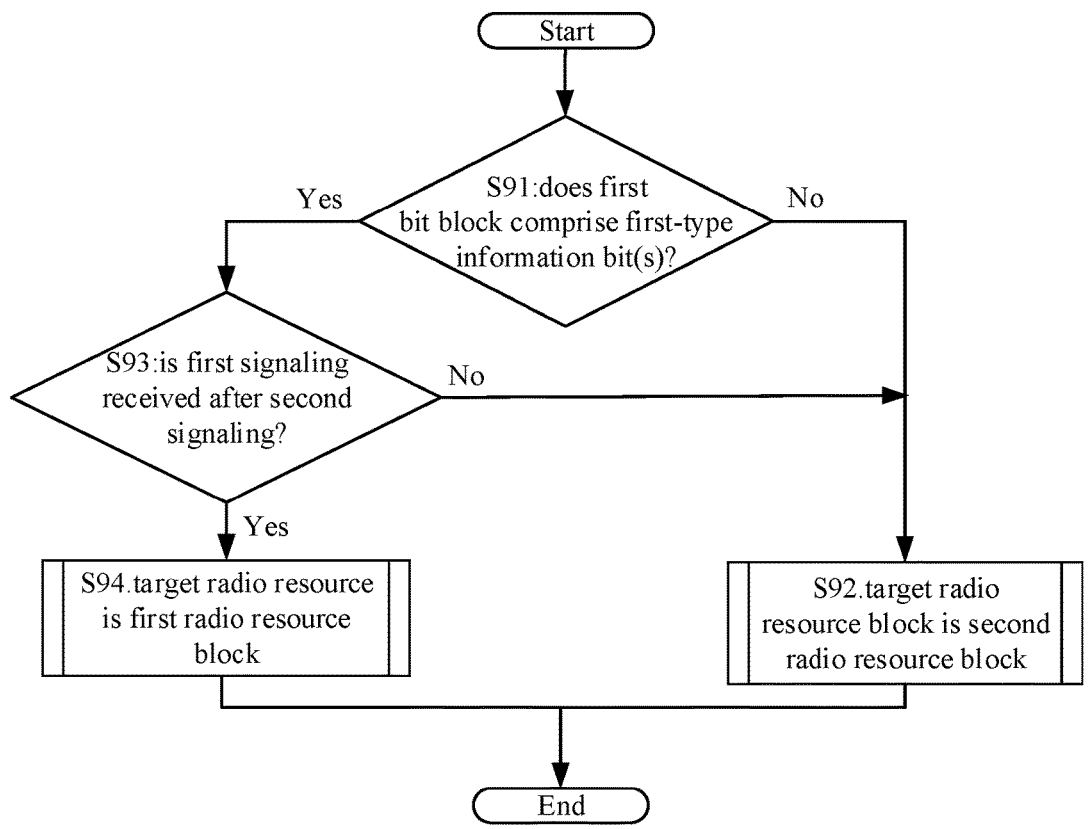
FIG. 9 illustrates a schematic diagram of procedures of determining a target radio resource block according to one embodiment of the present application.

Embodiment 9 illustrates a schematic diagram of procedures of determining a target radio resource block according to one embodiment of the present application, as shown in FIG. 9.

In Embodiment 9, the first node in the present application determines in step S91 whether a first bit block comprises a first-type information bit; if the determination turns out to be not comprising, move forward to step S92 to determine that a target radio resource block is a second radio resource block; if the determination turns out to be comprising, move forward to step S93 to determine whether a first signaling is received after a second signaling; if the determination turns out to be yes in step S93, move forward to step S94 to determine that the radio resource block is a first radio resource block; if the determination turns out to be no in step S93, move backward to step S92 to determine that the radio resource block is a second radio resource block.

In one embodiment different from Embodiment 9, no matter which type of information bit is comprised in the first bit block in the present application or how the temporal order that the first signaling and the second signaling in the present application are received is, the target radio resource block in the present application is always the second radio resource block in the present application.

In one embodiment, when the first bit block does not comprise the first-type information bit, the target radio resource block is the second radio resource block; When the first bit block comprises the first-type information bit, a temporal order in which the first signaling and the second signaling are received is used to determine the target radio resource block from the first radio resource block and the second radio resource block.

In one embodiment, when the first bit block does not comprise the first-type information bit, the target radio resource block is the second radio resource block; when the first bit block comprises the first-type information bit and the first signaling is not received after the second signaling, the target radio resource block is the second radio resource block; when the first bit block comprises the first-type information bit and the first signaling is received after the second signaling, the target radio resource block is the first radio resource block.

In one embodiment, when the first bit block does not comprise the first-type information bit, the target radio resource block is the second radio resource block; when the first bit block comprises the first-type information bit and the first signaling is received before the second signaling, the target radio resource block is the second radio resource block; when the first bit block comprises the first-type information bit and the first signaling is not received before the second signaling, the target radio resource block is the first radio resource block.

In one embodiment, when the target radio resource block is the first radio resource block, the first node drops transmitting the second bit block in the present application in the second radio resource block.

In one embodiment, when the first bit block does not comprise the first-type information bit, the target radio resource block is the second radio resource block, a field comprised in the second signaling being used to determine a total number of bits comprised in the first bit block; when the first bit block comprises the first-type information bit and the first signaling is not received after the second signaling, the target radio resource block is the second radio resource block, the first field in the second signaling being used to determine the total number of bits comprised in the first bit block; when the first bit block comprises the first-type information bit and the first signaling is received after the second signaling, the target radio resource block is the first radio resource block, the first field in the second signaling being not used to determine the total number of bits comprised in the first bit block.

Embodiment 10

Figure 10:
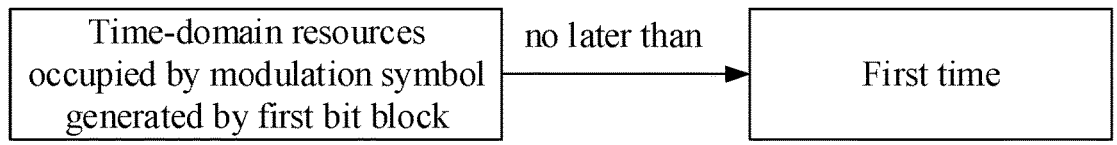
FIG. 10 illustrates a schematic diagram illustrating a relation between a first bit block and a first time according to one embodiment of the present application.

Embodiment 10 illustrates a schematic diagram illustrating a relation between a first bit block and a first time according to one embodiment of the present application, as shown in FIG. 10.

In Embodiment 10, time-domain resources occupied by a modulation symbol generated by a first bit block are no later than a first time.

In one embodiment, the first time is no later than an end time of the first radio resource block in time domain.

In one embodiment, the first time is no later than a third time: the third time is later than an end time of the first radio resource block in time domain, where a time gap between the end time of the first radio resource block in time domain and the third time is equal to time-domain resources occupied by M multicarrier symbol(s); M is a positive integer.

In one embodiment, the first time is no later than an end time of a first time-domain unit in time domain, the first time-domain unit comprising time-domain resources occupied by the first radio resource block.

In one embodiment, the first time-domain unit comprises one slot.

In one embodiment, the first time-domain unit comprises one sub-slot.

In one embodiment, the first time is no later than an end time of the second radio resource block in time domain.

In one embodiment, the first bit block is transmitted in the second radio resource block; a second field comprised in the second signaling is used to determine a number of REs occupied by the first bit block in the second radio resource block.

In one embodiment, the second field comprises a beta_offset indicator field.

In one embodiment, names of the second field include at least one of beta or offset.

In one embodiment, the first bit block comprises UCI: for a specific method in which the second field in the second signaling is used to determine the number of REs occupied by the first bit block in the second radio resource block, refer to 3GPP TS38.212, Section 6.3.2.4.

Embodiment 11

Figure 11:
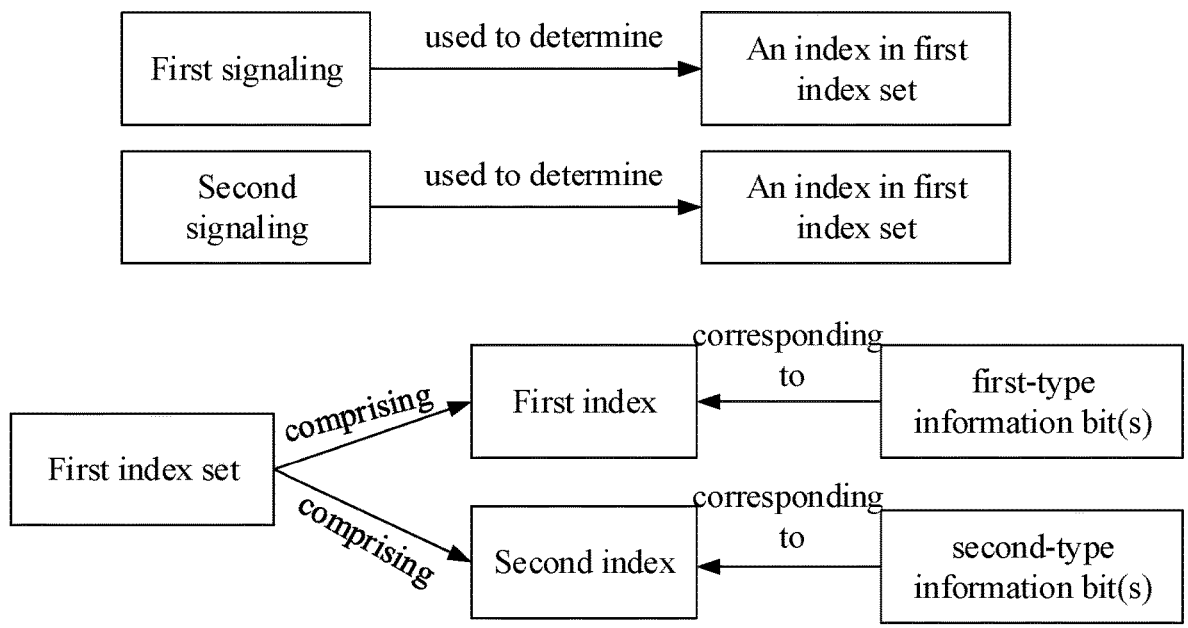
FIG. 11 illustrates a schematic diagram of relations among a first signaling, a second signaling, a first-type information bit, a second-type information bit, a first index set, a first index and a second index according to one embodiment of the present application.

Embodiment 11 illustrates a schematic diagram of relations among a first signaling, a second signaling, a first-type information bit, a second-type information bit, a first index set, a first index and a second index according to one embodiment of the present application, as shown in FIG. 11.

In Embodiment 11, a first signaling and a second signaling are respectively used to determine an index in a first index set; the first index set comprises a first index and a second index; first-type information bit(s) corresponds (correspond) to the first index, while second-type information bit(s) corresponds (correspond) to the second index.

In one embodiment, the first-type information bit is used to indicate whether a signaling indicating the first index is correctly received, or, the first-type information bit is used to indicate whether a bit block transmitted on a channel scheduled by a signaling indicating the first index is correctly received.

In one embodiment, the second-type information bit is used to indicate whether a signaling indicating the second index is correctly received, or, the second-type information bit is used to indicate whether a bit block transmitted on a channel scheduled by a signaling indicating the second index is correctly received.

In one embodiment, the first index set comprises multiple indexes.

In one embodiment, the first index set comprises multiple priority indexes.

In one embodiment, the first index and the second index are both priority indexes.

In one embodiment, the first index and the second index are both priority-related indexes.

In one embodiment, the first index and the second index are respectively indexes indicating different service types.

In one embodiment, the first index is Priority Index 1, and the second index is Priority Index 0.

In one embodiment, the first index is Priority Index 0, and the second index is Priority Index 1.

In one embodiment, the first signaling and the second signaling are respectively used to determine an index in a first index set; the first index set comprises a first index and a second index; the first-type information bit(s) corresponds (correspond) to the first index, while the second-type information bit(s) corresponds (correspond) to the second index.

In one embodiment, the second signaling is used to determine the first index.

In one embodiment, the first signaling indicates an index in the first index set.

In one embodiment, the first signaling explicitly indicates an index in the first index set.

In one embodiment, the first signaling implicitly indicates an index in the first index set.

In one embodiment, the first signaling comprises a priority indicator field; the priority indicator field comprised in the first signaling indicates an index in the first index set.

In one embodiment, the second signaling indicates an index in the first index set.

In one embodiment, the second signaling explicitly indicates an index in the first index set.

In one embodiment, the second signaling implicitly indicates an index in the first index set.

In one embodiment, the second signaling comprises a priority indicator field; the priority indicator field comprised in the second signaling indicates an index in the first index set.

In one embodiment, the second signaling is used to determine the second index.

In one embodiment, the second signaling indicates the second index.

In one embodiment, the second signaling explicitly indicates the second index.

In one embodiment, the second signaling implicitly indicates the second index.

In one embodiment, the second signaling comprises a priority indicator field; the priority indicator field comprised in the second signaling indicates the second index.

Embodiment 12

Figure 12:
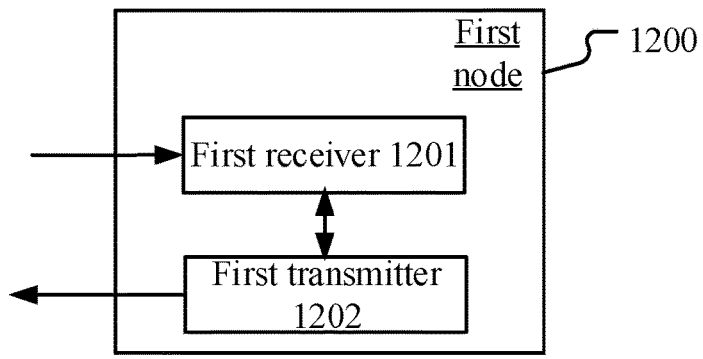
FIG. 12 illustrates a structure block diagram of a processing device in a first node according to one embodiment of the present application.

Embodiment 12 illustrates a structure block diagram of a processing device in a first node, as shown in FIG. 12. In FIG. 12, a processing device 1200 in a first node is comprised of a first receiver 1201 and a first transmitter 1202.

In one embodiment, the first node 1200 is a UE.

In one embodiment, the first node 1200 is a relay node.

In one embodiment, the first node 1200 is vehicle-mounted communication equipment.

In one embodiment, the first node 1200 is a UE supporting V2X communications.

In one embodiment, the first node 1200 is a relay node supporting V2X communications.

In one embodiment, the first receiver 1201 comprises at least one of the antenna 452, the receiver 454, the multi-antenna receiving processor 458, the receiving processor 456, the controller/processor 459, the memory 460 or the data source 467 in FIG. 4 of the present application.

In one embodiment, the first receiver 1201 comprises at least the first five of the antenna 452, the receiver 454, the multi-antenna receiving processor 458, the receiving processor 456, the controller/processor 459, the memory 460 and the data source 467 in FIG. 4 of the present application.

In one embodiment, the first receiver 1201 comprises at least the first four of the antenna 452, the receiver 454, the multi-antenna receiving processor 458, the receiving processor 456, the controller/processor 459, the memory 460 and the data source 467 in FIG. 4 of the present application.

In one embodiment, the first receiver 1201 comprises at least the first three of the antenna 452, the receiver 454, the multi-antenna receiving processor 458, the receiving processor 456, the controller/processor 459, the memory 460 and the data source 467 in FIG. 4 of the present application.

In one embodiment, the first receiver 1201 comprises at least the first two of the antenna 452, the receiver 454, the multi-antenna receiving processor 458, the receiving processor 456, the controller/processor 459, the memory 460 and the data source 467 in FIG. 4 of the present application.

In one embodiment, the first transmitter 1202 comprises at least one of the antenna 452, the transmitter 454, the multi-antenna transmitting processor 457, the transmitting processor 468, the controller/processor 459, the memory 460 or the data source 467 in FIG. 4 of the present application.

In one embodiment, the first transmitter 1202 comprises at least the first five of the antenna 452, the transmitter 454, the multi-antenna transmitting processor 457, the transmitting processor 468, the controller/processor 459, the memory 460 and the data source 467 in FIG. 4 of the present application.

In one embodiment, the first transmitter 1202 comprises at least the first four of the antenna 452, the transmitter 454, the multi-antenna transmitting processor 457, the transmitting processor 468, the controller/processor 459, the memory 460 and the data source 467 in FIG. 4 of the present application.

In one embodiment, the first transmitter 1202 comprises at least the first three of the antenna 452, the transmitter 454, the multi-antenna transmitting processor 457, the transmitting processor 468, the controller/processor 459 the memory 460 and the data source 467 in FIG. 4 of the present application.

In one embodiment, the first transmitter 1202 comprises at least the first two of the antenna 452, the transmitter 454, the multi-antenna transmitting processor 457, the transmitting processor 468, the controller/processor 459, the memory 460 and the data source 467 in FIG. 4 of the present application.

In Embodiment 12, the first receiver 1201 receives a first signaling and a second signaling; the first transmitter 1202 transmits a first signal in a target radio resource block, the first signal carrying a first bit block; herein, the first signaling is used to determine the first bit block, and the first signaling is used to determine a first radio resource block; the second signaling is used to determine a second radio resource block, the second radio resource block being reserved for a second bit block; the first radio resource block and the second radio resource block are overlapping in time domain; the target radio resource block is one of the first radio resource block or the second radio resource block; the first bit block comprises at least one of first-type information bit(s) or second-type information bit(s); the second signaling comprises a first field; when the first bit block does not comprise the first-type information bit(s), a field comprised in the second signaling is used to determine a total number of bits comprised in the first bit block; when the first bit block comprises the first-type information bit(s), a temporal order in which the first signaling and the second signaling are received is used to determine a relation between the first field in the second signaling and the total number of bits comprised in the first bit block.

In one embodiment, the first receiver 1201 receives a first signaling group; herein, each signaling in the first signaling group is used to determine the first bit block; the first signaling is a last one of signalings in the first signaling group.

In one embodiment, the target radio resource block is the second radio resource block; the first signal carries the second bit block.

In one embodiment, when the first bit block comprises the first-type information bit; the temporal order in which the first signaling and the second signaling are received is used to determine whether the first field in the second signaling is used to determine the total number of bits comprised in the first bit block.

In one embodiment, when the first bit block comprises the first-type information bit and the first signaling is not received after the second signaling, the first field in the second signaling is used to determine the total number of bits comprised in the first bit block; when the first bit block comprises the first-type information bit and the first signaling is received after the second signaling, the first field in the second signaling is not used to determine the total number of bits comprised in the first bit block.

In one embodiment, when the first bit block comprises the first-type information bit; the temporal order in which the first signaling and the second signaling are received is used to determine whether the first field in the second signaling is used to determine the total number of bits comprised in the first bit block or is at most used to determine a total number of bits comprised in a bit sub-block comprised in the first bit block.

In one embodiment, the first signaling and the second signaling are respectively used to determine an index in a first index set; the first index set comprises a first index and a second index; the first-type information bit(s) corresponds (correspond) to the first index, while the second-type information bit(s) corresponds (correspond) to the second index; the second signaling is used to determine the second index.

Embodiment 13

Figure 13:
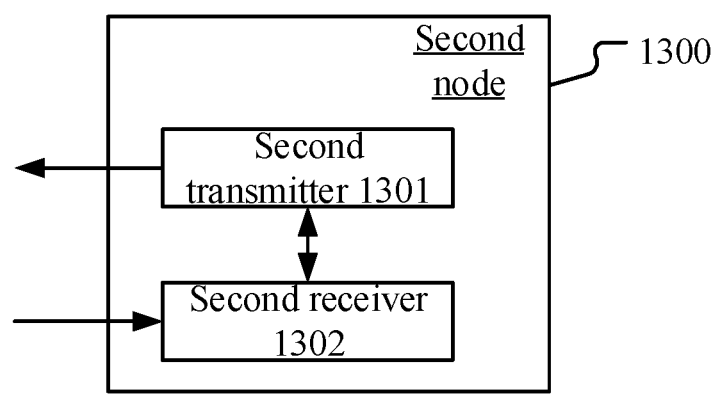
FIG. 13 illustrates a structure block diagram a processing device in a second node according to one embodiment of the present application.

Embodiment 13 illustrates a structure block diagram a processing device in a second node according to one embodiment of the present application, as shown in FIG. 13. In FIG. 13, a processing device 1300 in a second node is comprised of a second transmitter 1301 and a second receiver 1302.

In one embodiment, the second node 1300 is a UE.

In one embodiment, the second node 1300 is a base station.

In one embodiment, the second node 1300 is a relay node.

In one embodiment, the second node 1300 is vehicle-mounted communication equipment.

In one embodiment, the second node 1300 is UE supporting V2X communications.

In one embodiment, the second transmitter 1301 comprises at least one of the antenna 420, the transmitter 418, the multi-antenna transmitting processor 471, the transmitting processor 416, the controller/processor 475 or the memory 476 in FIG. 4 of the present application.

In one embodiment, the second transmitter 1301 comprises at least the first five of the antenna 420, the transmitter 418, the multi-antenna transmitting processor 471, the transmitting processor 416, the controller/processor 475 and the memory 476 in FIG. 4 of the present application.

In one embodiment, the second transmitter 1301 comprises at least the first four of the antenna 420, the transmitter 418, the multi-antenna transmitting processor 471, the transmitting processor 416, the controller/processor 475 and the memory 476 in FIG. 4 of the present application.

In one embodiment, the second transmitter 1301 comprises at least the first three of the antenna 420, the transmitter 418, the multi-antenna transmitting processor 471, the transmitting processor 416, the controller/processor 475 and the memory 476 in FIG. 4 of the present application.

In one embodiment, the second transmitter 1301 comprises at least the first two of the antenna 420, the transmitter 418, the multi-antenna transmitting processor 471, the transmitting processor 416, the controller/processor 475 and the memory 476 in FIG. 4 of the present application.

In one embodiment, the second receiver 1302 comprises at least one of the antenna 420, the receiver 418, the multi-antenna receiving processor 472, the receiving processor 470, the controller/processor 475 or the memory 476 in FIG. 4 of the present application.

In one embodiment, the second receiver 1302 comprises at least the first five of the antenna 420, the receiver 418, the multi-antenna receiving processor 472, the receiving processor 470, the controller/processor 475 and the memory 476 in FIG. 4 of the present application.

In one embodiment, the second receiver 1302 comprises at least the first four of the antenna 420, the receiver 418, the multi-antenna receiving processor 472, the receiving processor 470, the controller/processor 475 and the memory 476 in FIG. 4 of the present application.

In one embodiment, the second receiver 1302 comprises at least the first three of the antenna 420, the receiver 418, the multi-antenna receiving processor 472, the receiving processor 470, the controller/processor 475 and the memory 476 in FIG. 4 of the present application.

In one embodiment, the second receiver 1302 comprises at least the first two of the antenna 420, the receiver 418, the multi-antenna receiving processor 472, the receiving processor 470, the controller/processor 475 and the memory 476 in FIG. 4 of the present application.

In Embodiment 13, the second transmitter 1301 transmits a first signaling and a second signaling; the second receiver 1302 receives a first signal in a target radio resource block, the first signal carrying a first bit block; herein, the first signaling is used to determine the first bit block, and the first signaling is used to determine a first radio resource block; the second signaling is used to determine a second radio resource block, the second radio resource block being reserved for a second bit block; the first radio resource block and the second radio resource block are overlapping in time domain; the target radio resource block is one of the first radio resource block or the second radio resource block; the first bit block comprises at least one of first-type information bit(s) or second-type information bit(s); the second signaling comprises a first field; when the first bit block does not comprise the first-type information bit, a field comprised in the second signaling is used to determine a total number of bits comprised in the first bit block; when the first bit block comprises the first-type information bit, a temporal order in which the first signaling and the second signaling are received is used to determine a relation between the first field in the second signaling and the total number of bits comprised in the first bit block.

In one embodiment, the second transmitter 1301 transmits a first signaling group; herein, each signaling in the first signaling group is used to determine the first bit block; the first signaling is a last one of signalings in the first signaling group.

In one embodiment, the target radio resource block is the second radio resource block; the first signal carries the second bit block.

In one embodiment, when the first bit block comprises the first-type information bit; the temporal order in which the first signaling and the second signaling are received is used to determine whether the first field in the second signaling is used to determine the total number of bits comprised in the first bit block.

In one embodiment, when the first bit block comprises the first-type information bit and the first signaling is not received after the second signaling, the first field in the second signaling is used to determine the total number of bits comprised in the first bit block; when the first bit block comprises the first-type information bit and the first signaling is received after the second signaling, the first field in the second signaling is not used to determine the total number of bits comprised in the first bit block.

In one embodiment, when the first bit block comprises the first-type information bit; the temporal order in which the first signaling and the second signaling are received is used to determine whether the first field in the second signaling is used to determine the total number of bits comprised in the first bit block or is at most used to determine a total number of bits comprised in a bit sub-block comprised in the first bit block.

In one embodiment, the first signaling and the second signaling are respectively used to determine an index in a first index set; the first index set comprises a first index and a second index; the first-type information bit(s) corresponds (correspond) to the first index, while the second-type information bit(s) corresponds (correspond) to the second index; the second signaling is used to determine the second index.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The first node in the present application includes but is not limited to mobile phones, tablet computers, notebooks, network cards, low-consumption equipment, enhanced MTC (eMTC) terminals, NB-IoT terminals, vehicle-mounted communication equipment, aircrafts, airplanes, unmanned aerial vehicles, telecontrolled aircrafts, etc. The second node in the present application includes but is not limited to mobile phones, tablet computers, notebooks, network cards, low-consumption equipment, enhanced MTC (eMTC) terminals, NB-IoT terminals, vehicle-mounted communication equipment, aircrafts, airplanes, unmanned aerial vehicles, telecontrolled aircrafts, etc. The UE or terminal in the present application includes but is not limited to mobile phones, tablet computers, notebooks, network cards, low-consumption equipment, enhanced MTC (eMTC) terminals, NB-IoT terminals, vehicle-mounted communication equipment, aircrafts, airplanes, unmanned aerial vehicles, telecontrolled aircrafts, etc. The base station or network equipment in the present application includes but is not limited to macro-cellular base stations, micro-cellular base stations, home base stations, relay base station, eNB, gNB, Transmitter Receiver Point (TRP), GNSS, relay satellite, satellite base station, airborne base station and other radio communication equipment.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:

1. A first node for wireless communications, comprising:
a first receiver, receiving a first signaling and a second signaling; and
a first transmitter, transmitting a first signal in a target radio resource block, the first signal carrying a first bit block;
wherein the first signaling is used to determine the first bit block, and the first signaling is used to determine a first radio resource block; the second signaling is used to determine a second radio resource block, the second radio resource block being reserved for a second bit block; the first radio resource block and the second radio resource block are overlapping in time domain; the target radio resource block is one of the first radio resource block or the second radio resource block; the first bit block comprises at least one of first-type information bit(s) or second-type information bit(s); the second signaling comprises a first field; when the first bit block does not comprise the first-type information bit(s), a field comprised in the second signaling is used to determine a total number of bits comprised in the first bit block; when the first bit block comprises the first-type information bit(s), a temporal order in which the first signaling and the second signaling are received is used to determine a relation between the first field in the second signaling and the total number of bits comprised in the first bit block.

2. The first node according to claim 1, comprising:
the first receiver, receiving a first signaling group;
wherein each signaling in the first signaling group is used to determine the first bit block; the first signaling is a last one of signalings in the first signaling group.

3. The first node according to claim 1, wherein the target radio resource block is the second radio resource block; the first signal carries the second bit block.

4. The first node according to claim 1, wherein when the first bit block comprises the first-type information bit(s): the temporal order in which the first signaling and the second signaling are received is used to determine whether the first field in the second signaling is used to determine the total number of bits comprised in the first bit block.

5. The first node according to claim 1, wherein when the first bit block comprises the first-type information bit(s) and the first signaling is not received after the second signaling, the first field in the second signaling is used to determine the total number of bits comprised in the first bit block; when the first bit block comprises the first-type information bit(s) and the first signaling is received after the second signaling, the first field in the second signaling is not used to determine the total number of bits comprised in the first bit block.

6. The first node according to claim 1, wherein when the first bit block comprises the first-type information bit(s): the temporal order in which the first signaling and the second signaling are received is used to determine whether the first field in the second signaling is used to determine the total number of bits comprised in the first bit block or is at most used to determine a total number of bits comprised in a bit sub-block comprised in the first bit block.

7. The first node according to claim 1, wherein the first signaling and the second signaling are respectively used to determine an index in a first index set; the first index set comprises a first index and a second index; the first-type information bit(s) corresponds (correspond) to the first index, while the second-type information bit(s) corresponds (correspond) to the second index; the second signaling is used to determine the second index.

8. A second node for wireless communications, comprising:
a second transmitter, transmitting a first signaling and a second signaling; and
a second receiver, receiving a first signal in a target radio resource block, the first signal carrying a first bit block;
wherein the first signaling is used to determine the first bit block, and the first signaling is used to determine a first radio resource block; the second signaling is used to determine a second radio resource block, the second radio resource block being reserved for a second bit block; the first radio resource block and the second radio resource block are overlapping in time domain; the target radio resource block is one of the first radio resource block or the second radio resource block; the first bit block comprises at least one of first-type information bit(s) or second-type information bit(s); the second signaling comprises a first field; when the first bit block does not comprise the first-type information bit(s), a field comprised in the second signaling is used to determine a total number of bits comprised in the first bit block; when the first bit block comprises the first-type information bit(s), a temporal order in which the first signaling and the second signaling are received is used to determine a relation between the first field in the second signaling and the total number of bits comprised in the first bit block.

9. The second node according to claim 8, comprising:
the second transmitter, transmitting a first signaling group;
wherein each signaling in the first signaling group is used to determine the first bit block; the first signaling is a last one of signalings in the first signaling group.

10. The second node according to claim 8, wherein the target radio resource block is the second radio resource block; the first signal carries the second bit block.

11. The second node according to claim 8, wherein when the first bit block comprises the first-type information bit(s): the temporal order in which the first signaling and the second signaling are received is used to determine whether the first field in the second signaling is used to determine the total number of bits comprised in the first bit block.

12. The second node according to claim 8, wherein when the first bit block comprises the first-type information bit(s) and the first signaling is not received after the second signaling, the first field in the second signaling is used to determine the total number of bits comprised in the first bit block; when the first bit block comprises the first-type information bit(s) and the first signaling is received after the second signaling, the first field in the second signaling is not used to determine the total number of bits comprised in the first bit block.

13. The second node according to claim 8, wherein when the first bit block comprises the first-type information bit(s): the temporal order in which the first signaling and the second signaling are received is used to determine whether the first field in the second signaling is used to determine the total number of bits comprised in the first bit block or is at most used to determine a total number of bits comprised in a bit sub-block comprised in the first bit block.

14. A method in a first node for wireless communications, comprising:
receiving a first signaling and a second signaling; and
transmitting a first signal in a target radio resource block, the first signal carrying a first bit block;
wherein the first signaling is used to determine the first bit block, and the first signaling is used to determine a first radio resource block; the second signaling is used to determine a second radio resource block, the second radio resource block being reserved for a second bit block; the first radio resource block and the second radio resource block are overlapping in time domain; the target radio resource block is one of the first radio resource block or the second radio resource block; the first bit block comprises at least one of first-type information bit(s) or second-type information bit(s); the second signaling comprises a first field; when the first bit block does not comprise the first-type information bit(s), a field comprised in the second signaling is used to determine a total number of bits comprised in the first bit block; when the first bit block comprises the first-type information bit(s), a temporal order in which the first signaling and the second signaling are received is used to determine a relation between the first field in the second signaling and the total number of bits comprised in the first bit block.

15. The method in the first node according to claim 14, comprising:
receiving a first signaling group;
wherein each signaling in the first signaling group is used to determine the first bit block; the first signaling is a last one of signalings in the first signaling group.

16. The method in the first node according to claim 14, wherein the target radio resource block is the second radio resource block; the first signal carries the second bit block.

17. The method in the first node according to claim 14, wherein when the first bit block comprises the first-type information bit(s): the temporal order in which the first signaling and the second signaling are received is used to determine whether the first field in the second signaling is used to determine the total number of bits comprised in the first bit block.

18. The method in the first node according to claim 14, wherein when the first bit block comprises the first-type information bit(s) and the first signaling is not received after the second signaling, the first field in the second signaling is used to determine the total number of bits comprised in the first bit block; when the first bit block comprises the first-type information bit(s) and the first signaling is received after the second signaling, the first field in the second signaling is not used to determine the total number of bits comprised in the first bit block.

19. The method in the first node according to claim 14, wherein when the first bit block comprises the first-type information bit(s): the temporal order in which the first signaling and the second signaling are received is used to determine whether the first field in the second signaling is used to determine the total number of bits comprised in the first bit block or is at most used to determine a total number of bits comprised in a bit sub-block comprised in the first bit block.

20. The method in the first node according to claim 14, wherein the first signaling and the second signaling are respectively used to determine an index in a first index set; the first index set comprises a first index and a second index; the first-type information bit(s) corresponds (correspond) to the first index, while the second-type information bit(s) corresponds (correspond) to the second index; the second signaling is used to determine the second index.

* * * * *